United States Patent
Lee et al.

(10) Patent No.: US 12,216,560 B2
(45) Date of Patent: Feb. 4, 2025

(54) ELECTRONIC DEVICE SUPPORTING OUT-OF-BAND COMMUNICATION, AND METHOD OF OPERATING THE SAME

(71) Applicant: SAMSUNG ELECTRONICS CO., LTD., Suwon-si (KR)

(72) Inventors: Kyungkeun Lee, Suwon-si (KR); Bumjun Kim, Suwon-si (KR); Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/215,599

(22) Filed: Jun. 28, 2023

(65) Prior Publication Data
US 2024/0028493 A1    Jan. 25, 2024

(30) Foreign Application Priority Data

Jul. 21, 2022 (KR) .................... 10-2022-0090564
Jan. 2, 2023 (KR) .................... 10-2023-0000283

(51) Int. Cl.
G06F 11/30 (2006.01)
G06F 21/60 (2013.01)

(52) U.S. Cl.
CPC ...... *G06F 11/3034* (2013.01); *G06F 11/3058* (2013.01); *G06F 21/602* (2013.01)

(58) Field of Classification Search
CPC . G06F 11/3034; G06F 11/3058; G06F 21/602
See application file for complete search history.

(56) References Cited

U.S. PATENT DOCUMENTS

| | | |
|---|---|---|
| 9,298,607 B2 | 3/2016 | Zimmer et al. |
| 10,997,092 B2 | 5/2021 | Sahu et al. |
| 11,137,994 B2 | 10/2021 | Ladkani et al. |
| 11,320,990 B2 | 5/2022 | Gopal et al. |

(Continued)

FOREIGN PATENT DOCUMENTS

| | | |
|---|---|---|
| CN | 111459863 A | 7/2020 |
| CN | 112887227 A | 6/2021 |

(Continued)

OTHER PUBLICATIONS

"Base Specification", NVM Express, May 13, 2021, Revision 2.0. (400 pages total).

(Continued)

*Primary Examiner* — Matthew M Kim
*Assistant Examiner* — Indranil Chowdhury
(74) *Attorney, Agent, or Firm* — Sughrue Mion, PLLC

(57) ABSTRACT

Disclosed is a method of operating an electronic device which includes a host device and a storage device. The host device includes a processor and a baseboard management controller (BMC), the storage device includes a storage controller and a micro controller unit (MCU), and the BMC and the MCU support out-of-band communication. The method of operating the electronic device includes providing, by the BMC, a first request including information about environment data to the MCU through the out-of-band communication, and providing, by the MCU, a first response corresponding to the first request to the BMC through the out-of-band communication.

20 Claims, 16 Drawing Sheets

(56) References Cited

U.S. PATENT DOCUMENTS

| | | | |
|---|---|---|---|
| 2009/0164690 A1* | 6/2009 | Slaight | G06F 13/385 |
| | | | 714/776 |
| 2014/0195657 A1* | 7/2014 | Bhatia | H04L 41/04 |
| | | | 709/223 |
| 2014/0208133 A1* | 7/2014 | Gopal | G06F 11/2294 |
| | | | 713/310 |
| 2015/0286581 A1* | 10/2015 | Lee | G06F 12/1408 |
| | | | 713/189 |
| 2018/0292992 A1 | 10/2018 | Kachare et al. | |
| 2018/0359184 A1* | 12/2018 | Inbaraj | H04Q 9/00 |
| 2020/0050800 A1 | 2/2020 | Schauer et al. | |
| 2020/0349045 A1* | 11/2020 | Van De Groenendaal | |
| | | | G06F 11/34 |
| 2021/0397577 A1* | 12/2021 | Kahn | H04L 67/1097 |
| 2022/0129350 A1* | 4/2022 | Sharma | G06F 3/0619 |
| 2022/0200968 A1 | 6/2022 | Helmick et al. | |
| 2023/0350757 A1* | 11/2023 | Ladkani | G06F 11/1417 |
| 2023/0393959 A1* | 12/2023 | Li | G06F 11/3055 |
| 2024/0256159 A1* | 8/2024 | Lee | G06F 11/3058 |

FOREIGN PATENT DOCUMENTS

| | | | | |
|---|---|---|---|---|
| CN | 114651229 A | | 6/2022 | |
| CN | 114840456 A | | 8/2022 | |
| EP | 4180965 A1 * | | 5/2023 | G06F 11/0727 |
| EP | 4310658 A1 * | | 1/2024 | G06F 11/3034 |

OTHER PUBLICATIONS

Stenfort, Ross et al., "NVMe Cloud SSD Specification", OPEN Compute Project, Version 1.0, Mar. 18, 2020. (72 pages total).

* cited by examiner

FIG. 5

| Opcode | Request | | Response |
| --- | --- | --- | --- |
| | Command | | Data |
| 0xC0 | Sensor data command | | Current sensor data |
| 0xC1 | Log data command | | Log data (e.g. stored sensor data, stored telemetry data) |
| 0xC2 | Telemetry data command | | Current telemetry data |
| 0xC3 | Algorithm negotiation command | | An index indicating an algorithm supported by the storage device |
| 0xC4 | Encryption enable command | | An index indicating whether an encryption is enabled |

FIG. 10

| Index | Error Type | Status Code (error code) | Description |
|---|---|---|---|
| 1 | Invalid command opcode | 03h | Opcode invalid |
| 2 | Invalid parameter | 04h | IC invalid |
| 3 | Invalid parameter | 04h | ROR flag invalid |
| 4 | Invalid parameter | 04h | NVMe_MI message type invalid |
| 5 | Invalid command size | 05h | A size of a message body of a request is different than expected |
| 6 | Vendor specific | E1h | CRC error (message integrity check invalid) |
| 7 | Vendor specific | E2h | Algorithm is not supported |
| 8 | Vendor specific | E3h | Encryption error (decryption failed) |

ELECTRONIC DEVICE SUPPORTING OUT-OF-BAND COMMUNICATION, AND METHOD OF OPERATING THE SAME

CROSS-REFERENCE TO RELATED APPLICATIONS

This application claims priority under 35 U.S.C. § 119 to Korean Patent Application No. 10-2022-0090564 filed on Jul. 21, 2022, and Korean Patent Application No. 10-2023-0000283 filed on Jan. 2, 2023, in the Korean Intellectual Property Office, the disclosures of which are incorporated by reference herein in their entireties.

BACKGROUND

1. Field

One or more embodiments of the disclosure relate to an electronic device, and more particularly, to an electronic device supporting out-of-band communication and a method of operating the electronic device supporting out-of-band communication.

2. Description of Related Art

A memory device stores data in response to a write request and outputs data stored memory device in response to a read request. For example, the memory device may be classified as a volatile memory device or a non-volatile memory device. In the volatile memory device, the stored data is lost when a power supply is interrupted, such as a dynamic random access memory (DRAM) device or a static RAM (SRAM) device. In the non-volatile memory device, the stored data is retained data stored even when a power supply is interrupted, such as a flash memory device, a phase-change RAM (PRAM), a magnetic RAM (MRAM), or a resistive RAM (RRAM).

The non-volatile memory device may be also referred to as a storage device storing a large amount of data, and the storage device may communicate with a host device. A method in which an operating system of a host device communicates with a storage device may be referred to as an in-band management method, and a method in which a baseboard management controller (BMC) of the host device communicates with the storage device without using the operating system may be referred to as an out-of-band management method.

SUMMARY

Embodiments of the disclosure provide an electronic device supporting out-of-band communication and a method of operating the electronic device.

According to an aspect of the disclosure, there is provided a method of operating an electronic device including a host device having processor and a baseboard management controller (BMC), and a storage device having a storage controller and a micro controller unit (MCU), the method including: providing, by the BMC of the host device, a first request including a first opcode field indicating a request for environment data to the MCU of the storage device through an out-of-band communication; and providing, by the MCU, a first response including the environment data corresponding to the first request to the BMC through the out-of-band communication, wherein the processor of the host device and the storage controller of the storage device communicate with each other through an in-band communication different from the out-of-band communication, and wherein the BMC and the MCU directly communicate with each other through the out-of-band communication.

According to another aspect of the disclosure, there is provided a method of operating an electronic device including a host device including a processor and a baseboard management controller (BMC), a first storage device including a first storage controller and a first micro controller unit (MCU), and a second storage device including a second storage controller and a second MCU, the method including: providing, by the BMC, a first request including information corresponding to first environment data to the first MCU through an out-of-band communication; providing, by the first MCU, a first response corresponding to the first request to the BMC through the out-of-band communication; providing, by the BMC, a second request including information corresponding to second environment data to the second MCU through the out-of-band communication; and providing, by the second MCU, a second response corresponding to the second request to the BMC through the out-of-band communication, wherein the processor and the storage controller communicate with each other through an in-band communication different from the out-of-band communication.

According to another aspect of the disclosure, there is provided an electronic device including: a host device including a processor and a baseboard management controller (BMC); and a storage device including a storage controller and a micro controller unit (MCU), wherein the BMC is configured to provide a request including information corresponding to environment data to the MCU through an out-of-band communication, wherein the MCU is configured to provide a response corresponding to the request to the BMC through the out-of-band communication, and wherein the processor and the storage controller communicate with each other through an in-band communication different from the out-of-band communication.

BRIEF DESCRIPTION OF THE DRAWINGS

The above and other objects and features of the disclosure will become apparent by describing in detail embodiments thereof with reference to the accompanying drawings.

FIG. 5 is a diagram describing a protocol of out-of-band communication according to an example embodiment of the disclosure.

FIG. 10 is a diagram describing a protocol of out-of-band communication according to an example embodiment of the disclosure.

DETAILED DESCRIPTION

Below, embodiments of the disclosure will be described in detail and clearly to such an extent that one skilled in the art implements embodiment of the disclosure easily.

Figure 1:
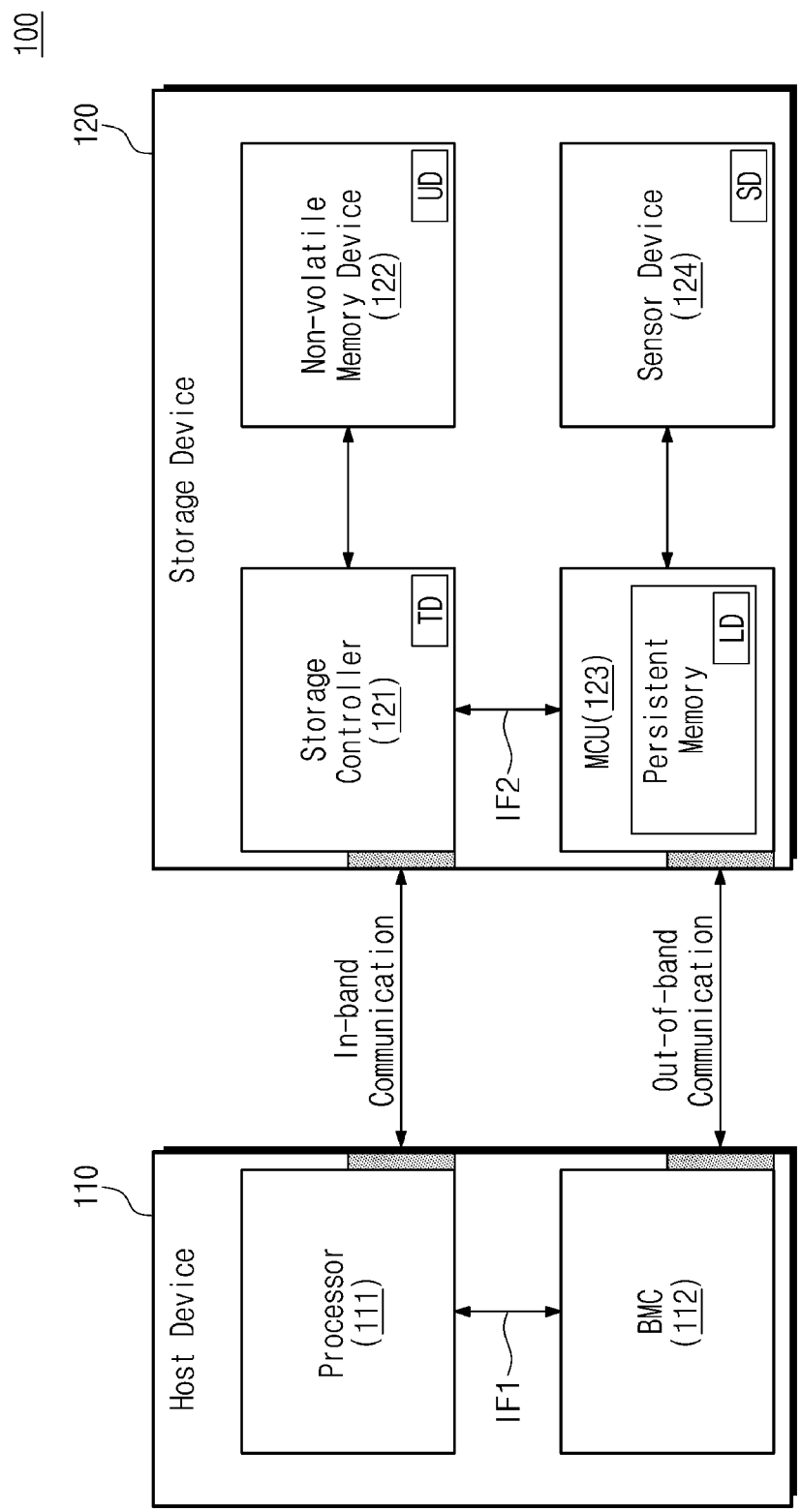
FIG. 1 is a block diagram of an electronic device according to an example embodiment of the disclosure.

FIG. 1 is a block diagram of an electronic device according to an example embodiment of the disclosure. Referring to FIG. 1, an electronic device 100 may include a host device 110 and a storage device 120. The electronic device 100 may refer to a device, which is configured to manage a large amount of user data UD. For example, the electronic device 100 may include a storage system, a server system, or a database server. However, the disclosure is not limited thereto, and as such, may include other devices. The user data UD may include a variety of information to be provided to the user, the information including, but not limited to, an image, a video, a text, and voice.

The host device 110 may control an overall operation of the electronic device 100. For example, the host device 110 may store data in the storage device 120, may read data stored in the storage device 120, or may manage environment data of the storage device 120 for the purpose of maintaining the reliability of data stored in the storage device 120.

The environment data may include physical environment information such as a voltage, a current, a temperature, and humidity. The physical environment information may be also referred to as "sensor data SD". The environment data may include health information such as program/erase (P/E) cycle information, program count information, erase count information, read count information, error bit count information, and threshold voltage distribution information. The health information may be used to manage the reliability of the user data UD. The health information may be also referred to as "telemetry data TD".

The host device 110 may include a processor 111 and a baseboard management controller (BMC) 112. The processor 111 and the BMC 112 may communicate with each other. For example, the processor 111 and the BMC 112 may communicate with each other through an interface (IF1).

The processor 111 may store data in the storage device 120 or may read data stored in the storage device 120. For example, the processor 111 may be implemented with a central processing unit (CPU). The processor 111 may execute an operating system (OS), and the operating system may support in-band communication with the storage device 120.

The in-band communication may refer to communication between the processor 111 of the host device 110 and a storage controller 121 of the storage device 120. For example, the operating system may be used in the in-band communication between the processor 111 and the storage controller 121.

The BMC 112 may manage the environment data of the storage device 120. For example, the BMC 112 may request a micro controller unit (MCU) 123 to perform a sensing operation or a monitoring operation. However, the request is not limited to the sensing operation or the monitoring operation, and as such, according to another example embodiment, the BMC 112 may request the MCU 123 to perform other operations. According to an example embodiment, the BMC 112 may receive the environment data from the MCU 123, and may provide the environment data to the processor 111. The operating system executed by the processor 111 may manage the storage device 120 based on the environment data obtained by the BMC 112.

The BMC 112 may support the out-of-band communication with the storage device 120. The out-of-band communication may refer to communication between the BMC 112 of the host device 110 and the MCU 123 of the storage device 120, and the operating system may not be used in the out-of-band communication. According to an example embodiment, an interface for the out-of-band communication may be provided independently of an interface for the in-band communication.

In an example embodiment, the out-of-band communication may support various protocols. For example, the out-of-band communication may support a protocol complying with the open computer project (OCP) standard. The out-of-band communication may support various kinds of protocols such as a Platform Level Data Model (PLDM) standard, a Network Controller Sideband Interface (NC-SI) standard, a Redfish standard, a Non-Volatile Memory Express Management Interface (NVMe_MI) standard, and a Management Component Transport Protocol (MCTP) standard.

The storage device 120 may include the storage controller 121, a non-volatile memory device 122, the MCU 123, and a sensor device 124.

The storage controller 121 may control an overall operation of the storage device 120. According to an example embodiment, the storage controller 121 may control an operation of the storage device 120 under control of the processor 111. For example, under control of the processor 111, the storage controller 121 may store the user data UD in the non-volatile memory device 122, may read the user data UD stored in the non-volatile memory device 122, or may generate the telemetry data TD by performing the monitoring operation on the non-volatile memory device 122. The monitoring operation may refer to a health check operation that is performed to check a degradation level of a threshold voltage distribution of the non-volatile memory device 122. The storage controller 121 may be also referred to as a "main controller".

The storage controller 121 may communicate with the processor 111, the non-volatile memory device 122, and the MCU 123. The storage controller 121 may support the in-band communication with the processor 111. The storage controller 121 may perform the monitoring operation on the non-volatile memory device 122. The storage controller 121 may provide the telemetry data TD to the MCU 123. According to an example embodiment, the storage controller 121 and the MCU 123 may communicate with each other through an interface (IF2).

In an example embodiment, the telemetry data TD may include at least one of P/E cycle information, program count information, erase count information, read count information, error bit count information, or threshold voltage distribution information.

The non-volatile memory device 122 may store the user data UD. For example, the non-volatile memory device 122 may store the user data UD under control of the storage controller 121 or may provide the user data UD to the storage controller 121. The threshold voltage distribution of memory cells of the non-volatile memory device 122 may correspond to the user data UD. The threshold voltage distribution of memory cells may change due to various factors such as retention, read disturb, and hot carrier injection (HCI). The storage controller 121 may manage the degradation level of the non-volatile memory device 122 by obtaining the telemetry data TD through the monitoring operation for the non-volatile memory device 122.

In an example embodiment, the non-volatile memory device 122 may be a NAND flash memory device, but the disclosure is not limited thereto. For example, the non-volatile memory device 122 may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

The MCU 123 may monitor the status of the storage device 120 and may manage an event occurring in the storage device 120. The event may include a voltage change, a current change, a humidity change, a temperature change, power-off, etc. The MCU 123 may receive a request associated with the environment data from the BMC 112 and may provide the BMC 112 with a response corresponding to the request of the BMC 112.

The MCU 123 may communicate with the BMC 112, the storage controller 121, and the sensor device 124. The MCU 123 may support the out-of-band communication with the BMC 112. The MCU 123 may receive the telemetry data TD from the storage controller 121. The MCU 123 may receive the sensor data SD from the sensor device 124.

The MCU 123 may include a persistent memory. For example, the persistent memory may be implemented with an electrically erasable programmable read-only memory (EEPROM). The MCU 123 may store at least one of the telemetry data TD and the sensor data SD in the persistent memory as log data LD. The log data LD may include at least one of telemetry data (hereinafter referred to as "previous telemetry data") obtained at a previous time and sensor data (hereinafter referred to as "previous sensor data") obtained at a previous time. For example, the log data LD may include at least one of telemetry data generated by the previous monitoring operation of the storage controller 121 and sensor data generated by the previous sensing operation of the sensor device 124. However, the disclosure is not limited thereto, and as such, according to an example embodiment, the log data LD may include a history of previously collected telemetry data and/or previously collected sensor data. For example, the previously collected telemetry data may include telemetry data collected at one or more previous times and the previously collected sensor data may include sensor data collected at one or more previous times.

The MCU 123 may provide the environment data to the BMC 112 depending on the request of the BMC 112. The environment data may include the sensor data SD, the log data LD, or the telemetry data TD. The MCU 123 may manage a security operation of the sensor data SD, the log data LD, and the telemetry data TD.

The sensor device 124 may sense a physical environment of the storage device 120 to generate the sensor data SD. The sensor device 124 may communicate with the MCU 123. The sensor device 124 may provide the sensor data SD to the MCU 123.

In an example embodiment, the sensor data SD may include at least one of voltage sensor data, current sensor data, temperature sensor data, and humidity sensor data.

As described above, according to an example embodiment of the disclosure, the electronic device 100 may include the host device 110 and the storage device 120. The host device 110 and the storage device 120 may support the in-band communication and the out-of-band communication. The BMC 112 of the host device 110 and the MCU 123 of the storage device 120 may transfer a variety of information in a bidirectional way by using the out-of-band communication.

Figure 2:
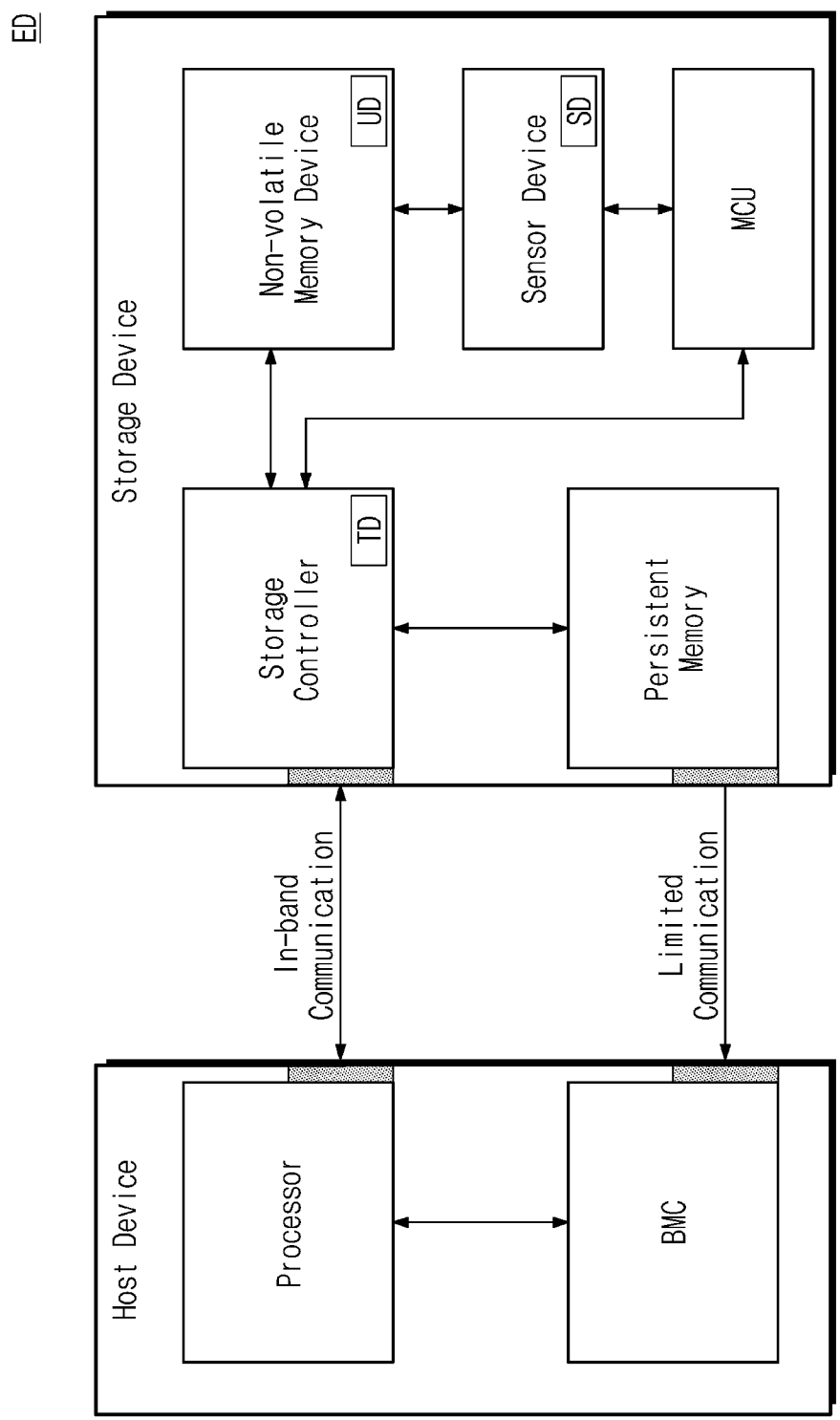
FIG. 2 is a block diagram of a related art electronic device.

FIG. 2 is a block diagram of a related art electronic device. For better understanding of the disclosure, a related art electronic device ED will be described with reference to FIG. 2, but the related art electronic device ED may include a component that is not disclosed in references of the information disclosure statement without intending to limit the scope and spirit of the invention.

The related art electronic device ED may include a host device and a storage device. The host device may include a processor and a BMC. The storage device may include a storage controller, a non-volatile memory device, an MCU, a sensor device, and a persistent memory.

The processor of the host device and the storage controller of the storage device may support the in-band communication. Through the in-band communication, the processor may provide the storage controller with a request including a command (e.g., a read command, a write command, or an erase command) indicating an operation to be performed in the storage device. Through the in-band communication, the storage controller may provide the processor with the user data UD received from the non-volatile memory device and environment data received from the MCU. The environment data may include at least one of the sensor data SD obtained by the sensing operation of the sensor device and the telemetry data TD obtained by the monitoring operation of the storage controller.

The BMC of the host device and the persistent memory of the storage device may support limited communication. Through the limited communication, the persistent memory may provide the BMC with information stored in the persistent memory (e.g., the stored information may be temperature information when the persistent memory includes a temperature sensor). The limited communication may refer to unidirectional communication from the persistent memory to the BMC.

In the related art electronic device ED, the BMC of the host device and the MCU of the storage device may fail to perform direct communication. The BMC may provide a request indicating management of the environment data to the MCU through the processor and the storage controller. The MCU may provide a response corresponding to the request of the BMC through the storage controller and the processor.

As described above, the related art electronic device ED may not support the out-of-band communication between the BMC and the MCU, and as such, the BMC and the MCU may indirectly communicate with each other through the in-band communication between the processor and the storage controller. In detail, in the related art electronic device ED, as the BMC and the MCU consume the bandwidth of the in-band communication to manage the environment data, an input/output (I/O) speed of the user data UD may decrease. Moreover, since a direct communication between the BMC and the MCU may not be supported, and since the BMC may not support the bidirectional communication with the storage device the number of types of information that the BMC receives from the persistent memory may be less than the number of types of information managed by the MCU. The in-band communication and the limited communication of the related art electronic device ED may fail to satisfy various requirements of a host device, a client or a manufacturer.

Figure 3:
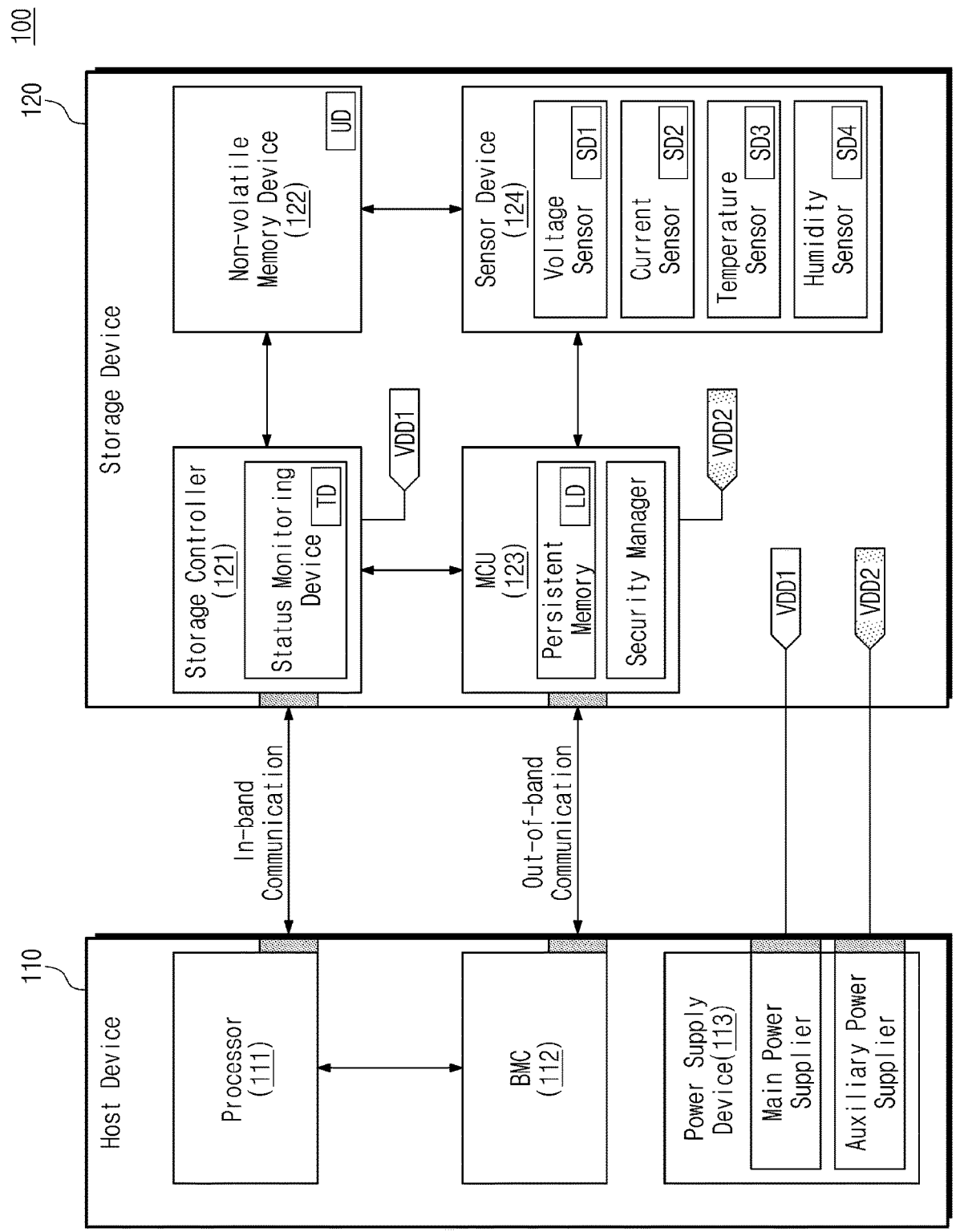
FIG. 3 is a block diagram of an electronic device according to an example embodiment of the disclosure.

FIG. 3 is a block diagram of an electronic device according to an example embodiment of the disclosure. Referring to FIG. 3, the electronic device 100 may include the host device 110 and the storage device 120. The host device 110 may include the processor 111, the BMC 112, and a power supply device 113. The storage device 120 may include the storage controller 121, the non-volatile memory device 122, the MCU 123, and the sensor device 124.

The processor 111, the BMC 112, the storage controller 121, the non-volatile memory device 122, the MCU 123, and the sensor device 124 may respectively correspond to the processor 111, the BMC 112, the storage controller 121, the non-volatile memory device 122, the MCU 123, and the sensor device 124 of FIG. 1.

The power supply device 113 may include a main power supplier and an auxiliary power supplier. The main power supplier may provide a first power supply voltage VDD1 to the storage device 120. The storage controller 121 of the storage device 120 may be driven by the first power supply voltage VDD1. The auxiliary power supplier may provide a second power supply voltage VDD2 to the storage device 120. The MCU 123 of the storage device 120 may be driven by the second power supply voltage VDD2.

The second power supply voltage VDD2 may be a power supply voltage provided independently of the first power supply voltage VDD1. For example, the main power supplier may provide the first power supply voltage VDD1 to the storage device 120 through a first supply line. The magnitude of the first power supply voltage VDD1 may be about 5 V or about 3.3 V. The auxiliary power supplier may provide the second power supply voltage VDD2 to the storage device 120 through a second supply line. The magnitude of the second power supply voltage VDD2 may be about 3.3 V.

The storage controller 121 may include a status monitoring device. For example, the status monitoring device may be implemented with a software device or firmware module that performs the health check operation of the non-volatile memory device 122. The status monitoring device may generate the telemetry data TD by performing the monitoring operation of the non-volatile memory device 122. The status monitoring device may provide the telemetry data TD to the MCU 123. The MCU 123 may store the telemetry data TD in a persistent memory as the log data LD or may provide the telemetry data TD to the BMC 112 through the out-of-band communication.

The MCU 123 may include the persistent memory and a security manager. The persistent memory may store the log data LD. The log data LD may include at least one of previous telemetry data received from the storage controller 121 and previous sensor data received from the sensor device 124. The MCU 123 may receive a request for the log data LD from the BMC 112 and may provide a response including the log data LD stored in the persistent memory to the BMC 112.

The security manager may manage a security operation performed on the environment data. For example, the security manager may be implemented with a software device or firmware module that performs the security operation. The security manager may negotiate a security algorithm through the out-of-band communication with the BMC 112. Depending on the negotiated security algorithm, the security manager may enable the encryption of the environment data or may disable the encryption of the environment data.

The sensor device 124 may include a voltage sensor, a current sensor, a temperature sensor, and a humidity sensor. The voltage sensor may sense a voltage provided to the non-volatile memory device 122 and may generate first sensor data SD1. The current sensor may sense a current provided to the non-volatile memory device 122 and may generate second sensor data SD2. The temperature sensor may sense a temperature of the non-volatile memory device 122 and may generate third sensor data SD3. The humidity sensor may sense humidity of the non-volatile memory device 122 and may generate fourth sensor data SD4. The first sensor data SD1, the second sensor data SD2, the third sensor data SD3, and fourth sensor data SD4 may correspond to the sensor data SD of FIG. 1.

The sensor device 124 may provide at least one of the first sensor data SD1, the second sensor data SD2, the third sensor data SD3, and fourth sensor data SD4 to the MCU 123 as sensor data. The MCU 123 may store the sensor data in the persistent memory as the log data LD or may provide the sensor data to the BMC 112 through the out-of-band communication.

The processor 111 of the host device 110 and the storage controller 121 of the storage device 120 may support the in-band communication. Through the in-band communication, the processor 111 may provide the storage controller 121 with a request including a command (e.g., a read command, a write command, or an erase command) indicating an operation to be performed in the storage device 120. Through the in-band communication, the storage controller 121 may provide the processor 111 with a response corresponding to the request of the processor 111.

The BMC 112 of the host device 110 and the MCU 123 of the storage device 120 may support the out-of-band communication. Through the out-of-band communication, the BMC 112 may provide the MCU 123 with a request indicating the management of the environment data. Through the out-of-band communication, the MCU 123 may provide the BMC 112 with a response corresponding to the request of the BMC 112.

In other words, the BMC 112 and the MCU 123 may directly communicate with each other through the out-of-band communication. The BMC 112 and the MCU 123 may directly communicate with each other through the out-of-band communication without consuming the bandwidth of the in-band communication. The BMC 112 and the MCU 123 may perform bidirectional communication through the out-of-band communication. The MCU 123 may provide a variety of information about the environment data to the BMC 112 through the out-of-band communication. The out-of-band communication may provide the client or manufacturer with various and flexible communication interface environments.

Figure 4:
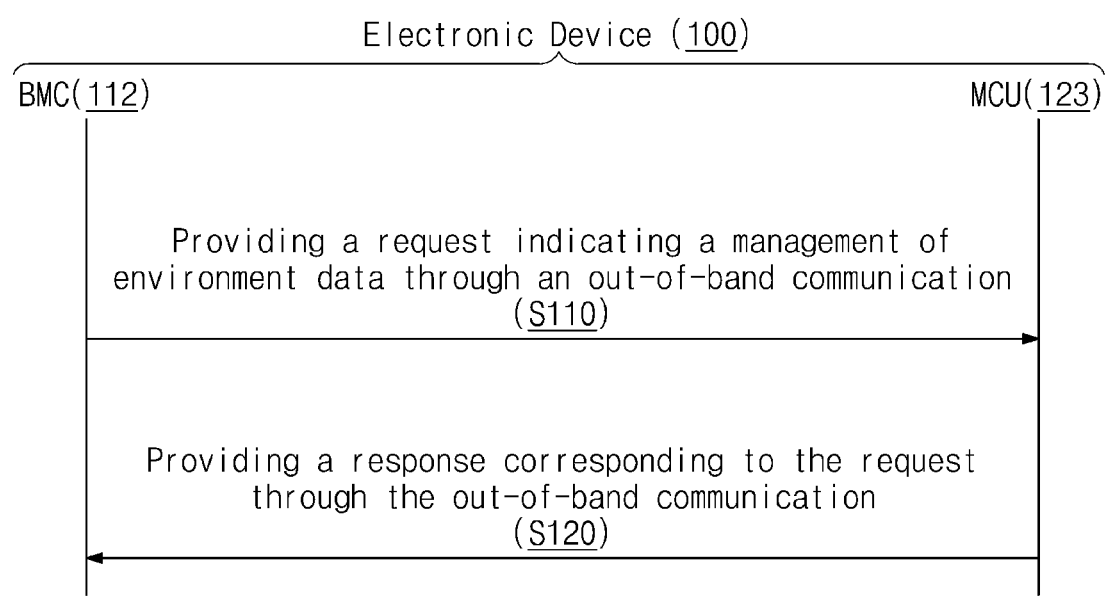
FIG. 4 is a flowchart describing a method of operating an electronic device according to an example embodiment of the disclosure.

FIG. 4 is a flowchart describing a method of operating an electronic device according to an example embodiment of the disclosure. A method of operating an electronic device according to an example embodiment of the disclosure will be described with reference to FIG. 4.

The electronic device 100 may include the BMC 112 and the MCU 123. The BMC 112 and the MCU 123 may respectively correspond to the BMC 112 and the MCU 123 of FIG. 1. In detail, the electronic device 100 may include a host device and a storage device. The host device may include a processor and the BMC 112. The storage device may include a storage controller and the MCU 123. The processor and the storage controller may support the in-band communication. The BMC 112 and the MCU 123 may support the out-of-band communication.

In operation S110, the BMC 112 of the electronic device 100 may provide a request indicating the management of the environment data to the MCU 123 through the out-of-band communication.

In an example embodiment, the environment data may include sensor data, log data, or telemetry data. For example, the sensor data may be generated based on the sensing operation. The telemetry data may be generated based on the monitoring operation. The log data may include at least one of previous sensor data generated based on a previous sensing operation and previous telemetry data generated based on a previous monitoring operation.

In an example embodiment, the management of the environment data may include the security operation for the environment data. For example, the security operation may include negotiating the security algorithm to be used to transfer the environment data, enabling the encryption of the environment data depending on the security algorithm selected by the negotiation of the security algorithm, and disabling the encryption of the environment data.

In operation S120, the MCU 123 of the electronic device 100 may provide a response corresponding to the request in operation S110 to the BMC 112 through the out-of-band communication. For example, the response in operation S120 may indicate the environment data, the selected security algorithm, or whether the enable or disable of the encryption succeeds.

FIG. 5 is a diagram describing a protocol of out-of-band communication according to an example embodiment of the disclosure. Referring to FIG. 5, the protocol of the out-of-band communication may include a request and a response. For example, the request may be one of various requests and the response may be one of various responses. According to an example embodiment, the request may include information about the environment data. For example, the request may include an opcode field. According to an example embodiment, data (e.g., a series of bits) written in the opcode field of the request may indicate information about the environment data. The response may include a data field. The request and the response may have a correspondence relationship.

A request in which a value of bits of the opcode field is "0xC0" may indicate a sensor data command. The data field of the response corresponding to the request indicating the sensor data command may include current sensor data. For example, the current sensor data may refer to sensor data generated by the sensing operation of the storage device. This will be described in detail with reference to FIG. 6A.

A request in which a value of bits of the opcode field is "0xC1" may indicate a log data command. The data field of the response corresponding to the request indicating the log data command may include log data. For example, the log data may include sensor data stored in the persistent memory of the MCU or telemetry data stored in the persistent memory. The stored sensor data may refer to previous sensor data generated by the previous sensing operation of the storage device. The stored telemetry data may refer to previous telemetry data generated by the previous monitoring operation. This will be described in detail with reference to FIG. 6B.

A request in which a value of bits of the opcode field is "0xC2" may indicate a telemetry data command. The data field of the response corresponding to the request indicating the telemetry data command may include current telemetry data. For example, the current telemetry data may refer to telemetry data generated by the monitoring operation of the storage device. This will be described in detail with reference to FIG. 6C.

A request in which a value of bits of the opcode field is "0xC3" may indicate an algorithm negotiation command. The data field of the response corresponding to the request indicating the algorithm negotiation command may include an index indicating a security algorithm selected by the storage device. This will be described in detail with reference to FIG. 6D.

A request in which a value of bits of the opcode field is "0xC4" may indicate an encryption enable command. The data field of the response corresponding to the request indicating the encryption enable command may include an index indicating whether the encryption is enabled. This will be described in detail with reference to FIG. 6E.

However, the disclosure is not limited thereto. For example, the requests and responses described with reference to FIG. 5 may be subdivided into sub-requests and sub-responses or may be integrated into a comprehensive request and a comprehensive response, or a request and a response for processing other kinds of operations may be further added.

FIGS. 6A to 6E are diagrams describing fields of a protocol of out-of-band communication according to an example embodiment of the disclosure. Descriptions of FIGS. 6A to 6E may correspond to the sensor data command, the log data command, the telemetry data command, the algorithm negotiation command, and the encryption enable command of FIG. 5, respectively.

In FIGS. 6A to 6E, requests RQa, RQb, RQc, RQd, and RQe and responses RPa, RPb, RPc, RPd, and RPe may be referred to as "messages".

According to an example embodiment, each of the messages may include at least one of a message type field, an integrity check (IC) field, a command slot identifier (CSI) field, a reserved field, an NVMe_MI message type field, a request or response (ROR) field, a management endpoint buffer (MEB) field, a command initiated auto pause (CIAP) field, an opcode field, at least one NVMe management request deword fields, a status code field, a response body field, and a message integrity check field.

The message type field may indicate a message type. The message may correspond to the request or response. For example, when using MCTP (Management Component Transport Protocol), the value of the message type field may be set to 0x4. The value of the message type field may be determined depending on a standard or a type of a used protocol.

The IC field may indicate whether data are protected by a cyclic redundancy check (CRC) defined in a corresponding protocol. When using the MCTP protocol, the value of the IC field may be set to 0x1.

The CSI field may be used to distinguish command slots. For example, the NVMe_MI standard may define two command slots. The CSI field may indicate whether a request or response corresponds to any command slot.

The reserved field may be a preliminary field. For example, the reserved field may be emptied. The reserved field may include arbitrary fields that describe a request or response.

The NVMe_MI message type field may indicate a message type defined in the NVMe standard. The NVMe_MI message type field may indicate whether a message is a command complying with any NVMe standard.

The ROR field may indicate whether a corresponding message is a request or a response. For example, when a flag value of the ROR field is 0, the message may correspond to the request. When the flag value of the ROR field is 1, the message may correspond to the response.

The MEB field may be used to refer to a buffer when the size of the message exceeds a reference size. For example, in the NVMe_MI standard, a reference size of the response body field of the message may be 4224 bytes. When the size of the response body field of the message is smaller than or equal to 4224 bytes, the MEB field may be emptied. When the size of the response body field of the message is greater than 4224 bytes, the MEB field may include indexes that are used to refer to buffers.

The CIAP field may determine the order of processing messages. For example, when the value of the CIAP field is 1, the BMC 112 or the MCU 123 that receives a relevant message may stop the previous operation and may process the relevant message with priority. When the value of the CIAP field is 0, the BMC 112 or the MCU 123 that receives the message may perform the relevant message after completing the previous operation.

The opcode field may include bits corresponding to a command (refer to FIG. 5)

The at least one NVMe management request dword fields may be data fields. Depending on the command type, the NVMe management request dword fields may be emptied, may indicate security algorithms supported by the BMC 112, or may indicate whether the encryption is enabled.

The status code field may be included in a message corresponding to a response. The status code field may indicate whether the request is successfully processed. When the request is successfully processed, the status code field may include a success code. When the processing of the request fails, the status code field may include an error code describing the failure.

The response body field may be included in a message corresponding to a response. The response body field may include environment data requested by the BMC 112, a security algorithm selected by the BMC 112, or a security key value used in an encryption operation corresponding to the selected security algorithm. The encryption operation may include encryption and decryption corresponding to the selected security algorithm.

The message integrity check field may indicate whether a message integrity check is valid. For example, the message integrity check field may indicate whether a relevant message has integrity as a result of the cyclic redundancy check (CRC).

For better understanding of the disclosure, FIGS. 6A to 6E describe various fields with reference to the NVMe_MI standard, but the disclosure is not limited thereto. In addition to the NVMe_MI standard, the disclosure may be applied to various types of protocols supporting the out-of-band communication, such as a PLDM standard, an NC-SI standard, a redfish standard, and an MCTP standard.

Below, features of a request and a response according to a command kind will be described independently with reference to FIGS. 6A to 6E.

Figure 6A:
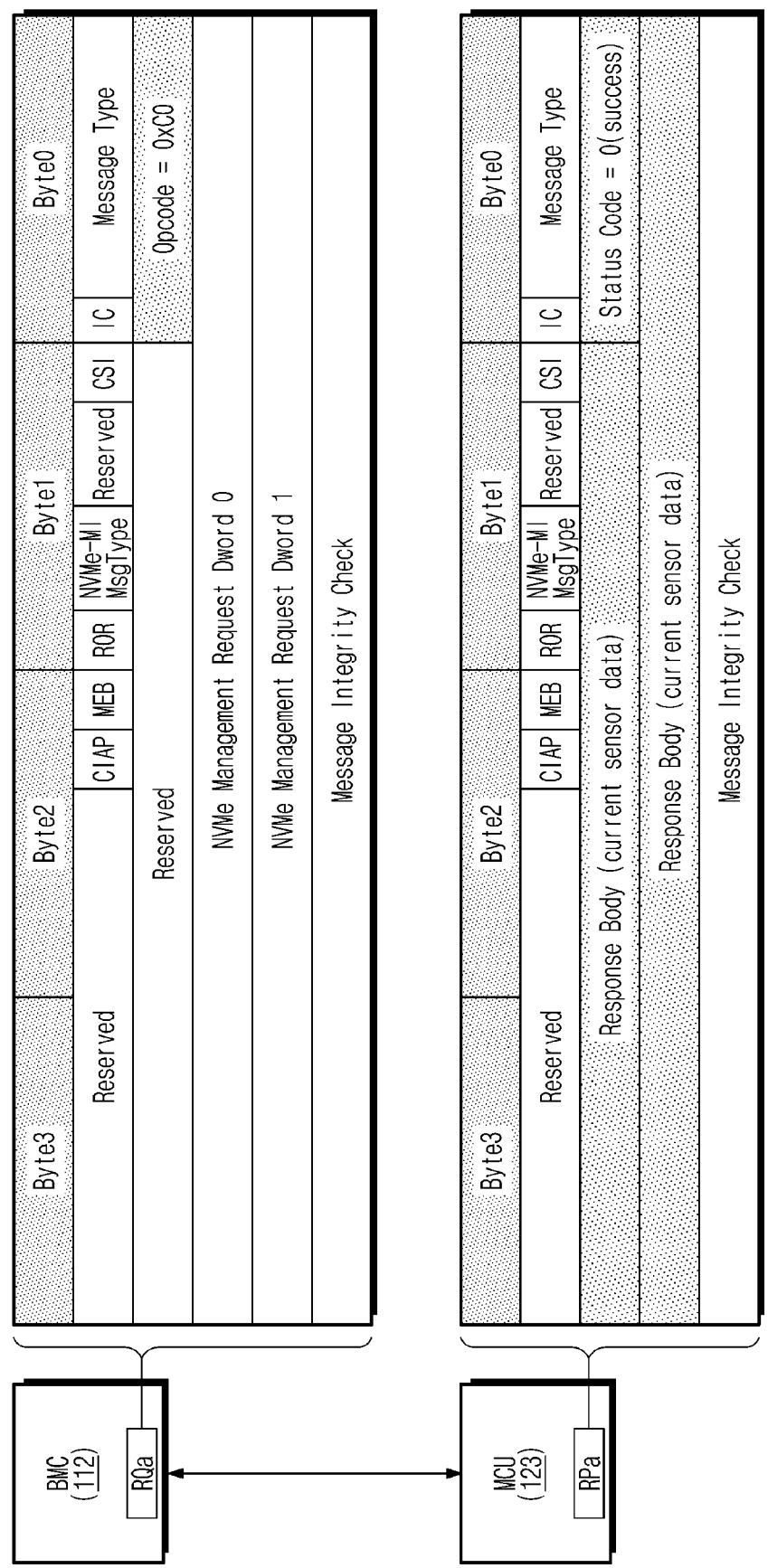
FIGS. 6A-6E are diagrams describing fields of a protocol of out-of-band communication according to an example embodiment of the disclosure.

Referring to FIG. 6A, the BMC 112 may provide the request RQa to the MCU 123 through the out-of-band communication. The MCU 123 may provide the response RPa to the BMC 112 through the out-of-band communication.

A value of the bits of the opcode field of the request RQa may be 0xC0. The request RQa may correspond to the sensor data command. The MCU 123 may successfully perform the sensing operation based on the request RQa. The MCU 123 may generate the sensor data based on the sensing operation. The sensor data may be current sensor data obtained by the sensing operation.

A status code of the response RPa may include a success code. The success code of the response RPa may indicate that the MCU 123 successfully processes the request RQa. For example, a value of the success code may be 0. The response body field of the response RPa may include the current sensor data.

Figure 6B:
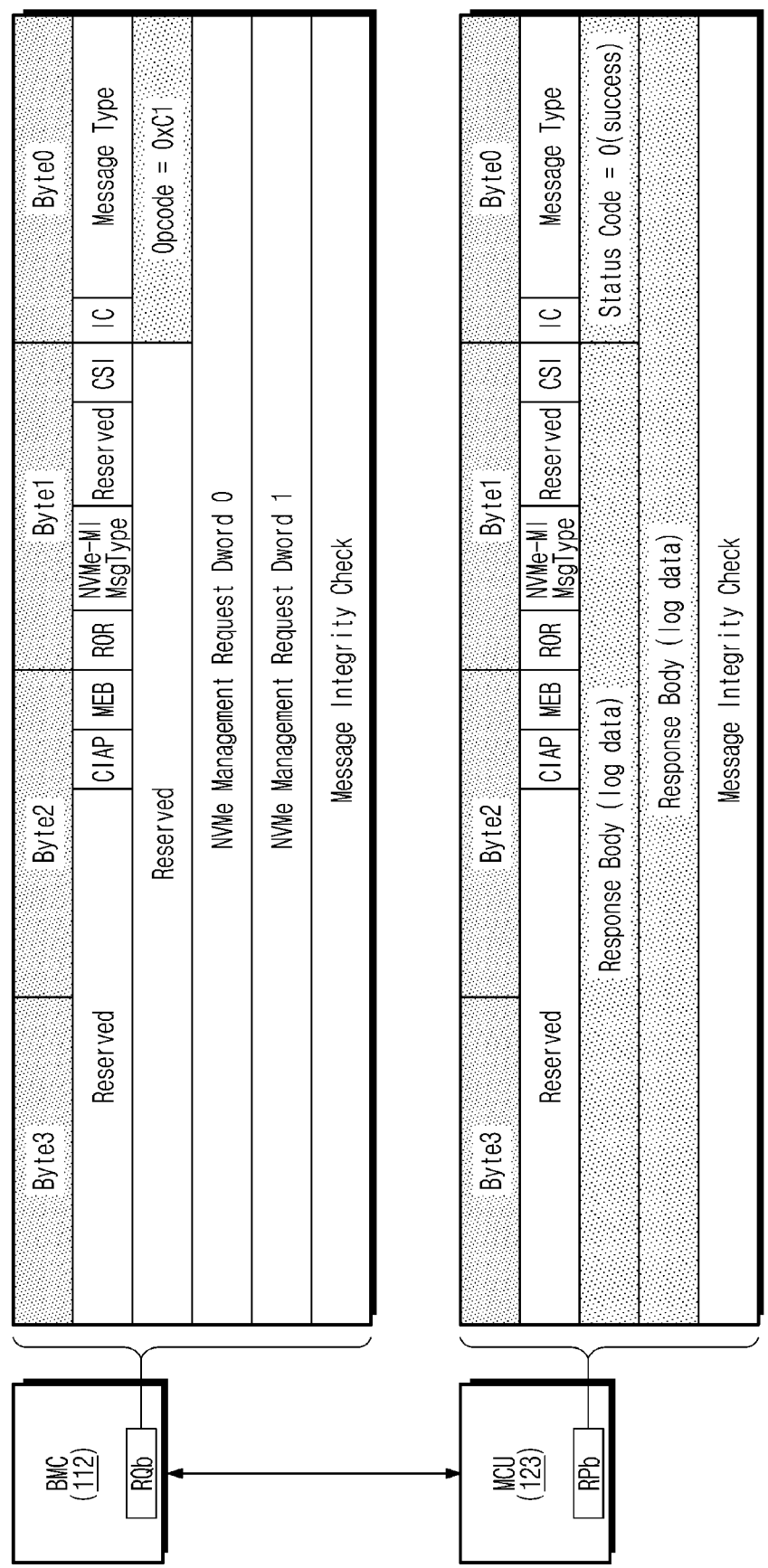

Referring to FIG. 6B, the BMC 112 may provide the request RQb to the MCU 123 through the out-of-band communication. The MCU 123 may provide the response RPb to the BMC 112 through the out-of-band communication.

A value of the bits of the opcode field of the request RQb may be 0xC1. The request RQb may correspond to the log data command. The MCU 123 may successfully load the log data stored in the persistent memory of the MCU 123 based on the request RQb. The log data may include at least one of previous sensor data obtained by the previous sensing operation and previous telemetry data obtained by the previous monitoring operation.

A status code of the response RPb may include a success code. The success code of the response RPb may indicate that the MCU 123 successfully processes the request RQb. The response body field of the response RPb may include the log data.

Figure 6C:
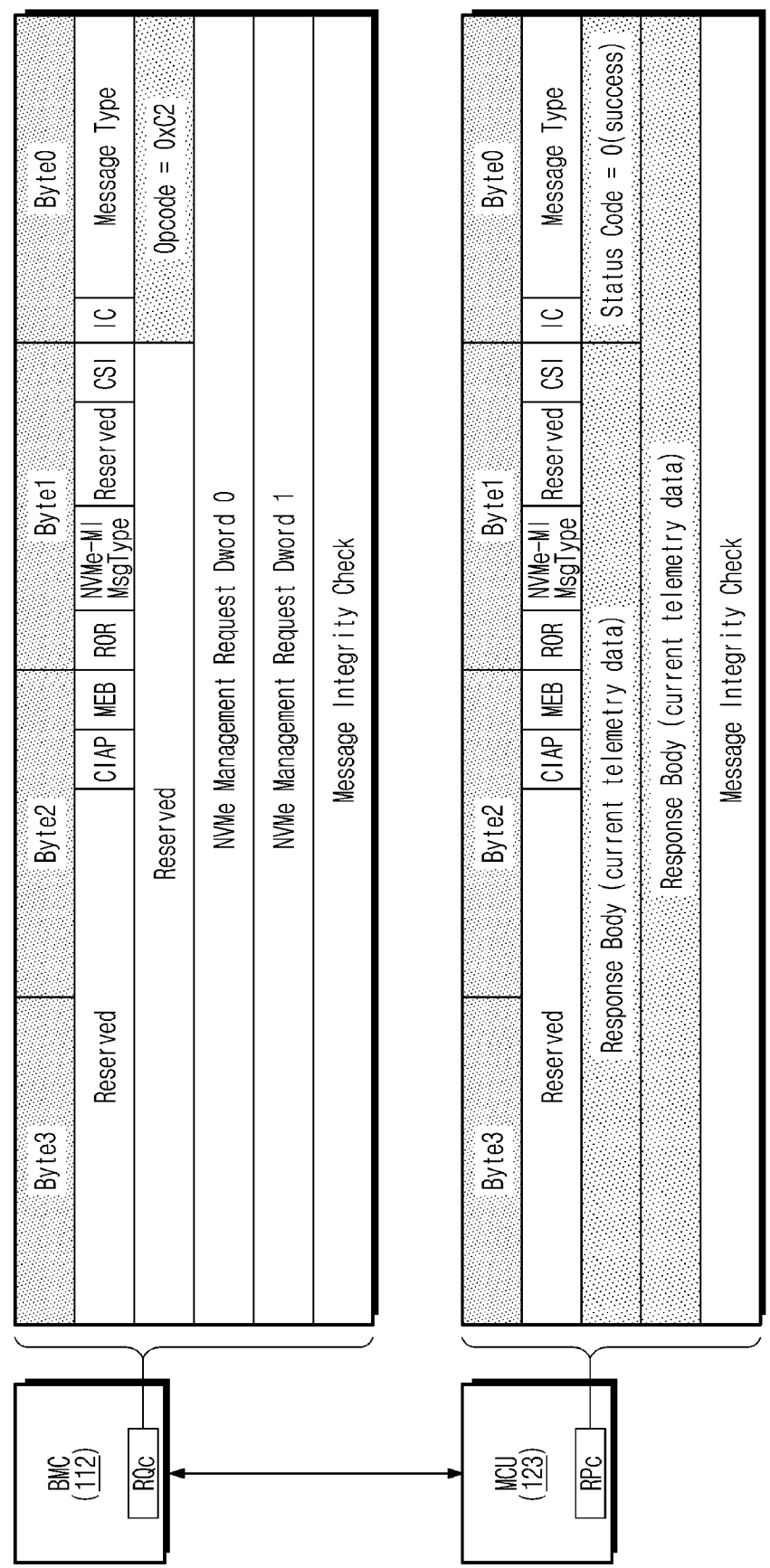

Referring to FIG. 6C, the BMC 112 may provide the request RQc to the MCU 123 through the out-of-band communication. The MCU 123 may provide the response RPc to the BMC 112 through the out-of-band communication.

A value of the bits of the opcode field of the request RQc may be 0xC2. The request RQc may correspond to the telemetry data command. The MCU 123 may successfully perform the monitoring operation based on the request RQc. The MCU 123 may generate the telemetry data based on the monitoring operation. The telemetry data may be current telemetry data obtained by the monitoring operation.

A status code of the response RPc may include a success code. The success code of the response RPc may indicate that the MCU 123 successfully processes the request RQc. The response body field of the response RPc may include the current telemetry data.

Figure 6D:
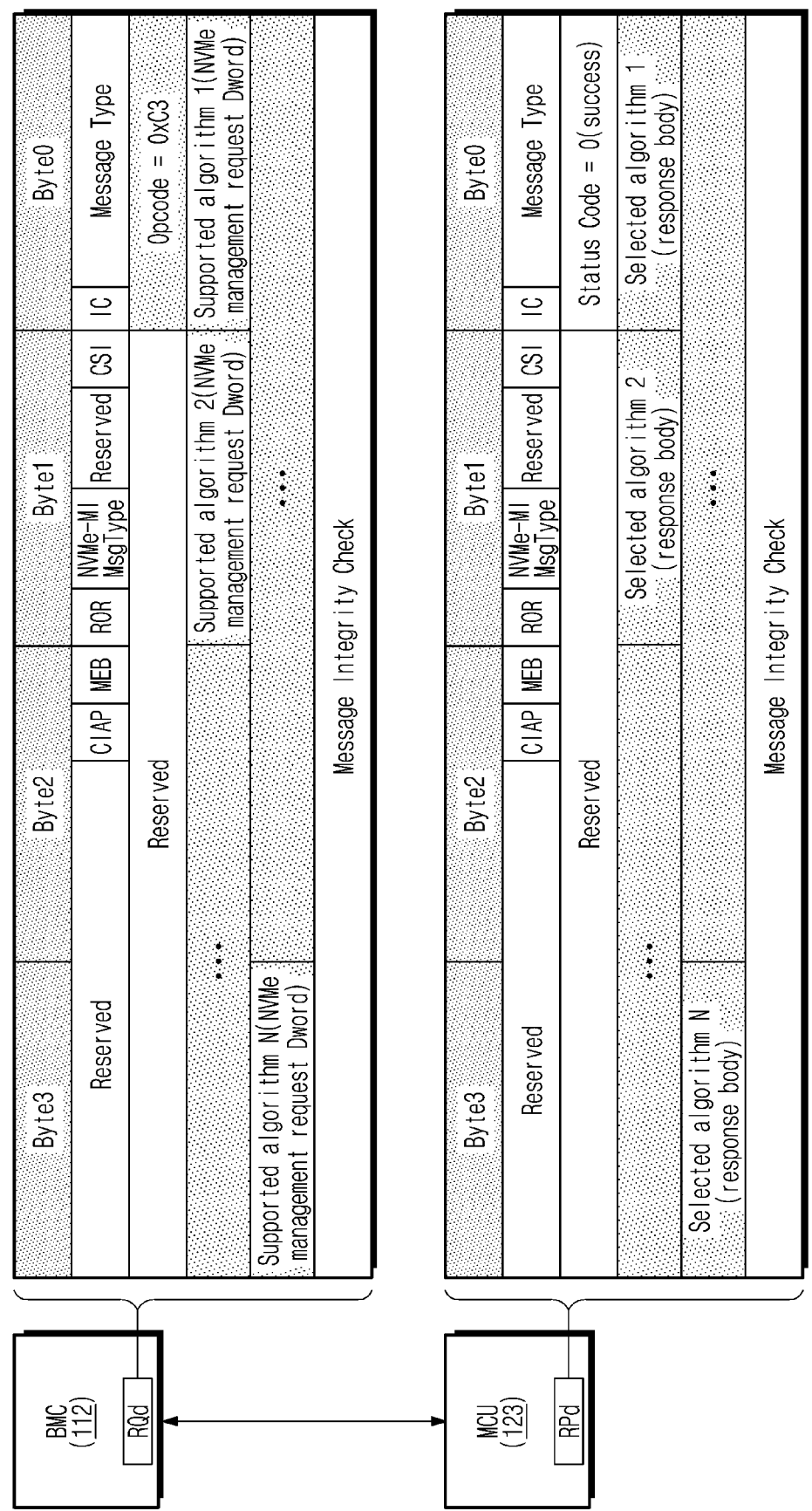

Referring to FIG. 6D, the BMC 112 may provide the request RQd to the MCU 123 through the out-of-band communication. The MCU 123 may provide the response RPd to the BMC 112 through the out-of-band communication.

A value of the bits of the opcode field of the request RQd may be 0xC3. The request RQd may correspond to the algorithm negotiation command. The at least NVMe management request dword fields of the request RQd may include first to N-th security algorithms that are supported by the BMC 112. The first to N-th security algorithms may be security algorithms that are supported by the BMC 112. Herein, "N" is an arbitrary natural number. The first to N-th security algorithms may be different in an encryption method or rule. The MCU 123 may determine one of the first to N-th security algorithms as a target security algorithm, based on the request RQd.

A status code of the response RPd may include a success code. The success code of the response RPd may indicate that the MCU 123 successfully processes the request RQd. The response body field of the response RPd may include the target security algorithm selected by the MCU 123 from among the first to N-th security algorithms supported by the BMC 112. For example, the MCU 123 may select one of the first to N-th security algorithms as the target security algorithm. In the response body field of the response RPd, the target security algorithm may have a first value, and each of the remaining security algorithms other than the target security algorithm among the first to N-th security algorithms may have a second value.

In an example embodiment, each of the first to N-th security algorithms may include an index for identification of an algorithm and a security key value of the BMC 112 or a security key value of the MCU 123, which is used in the encryption operation corresponding to a relevant security algorithm.

Figure 6E:
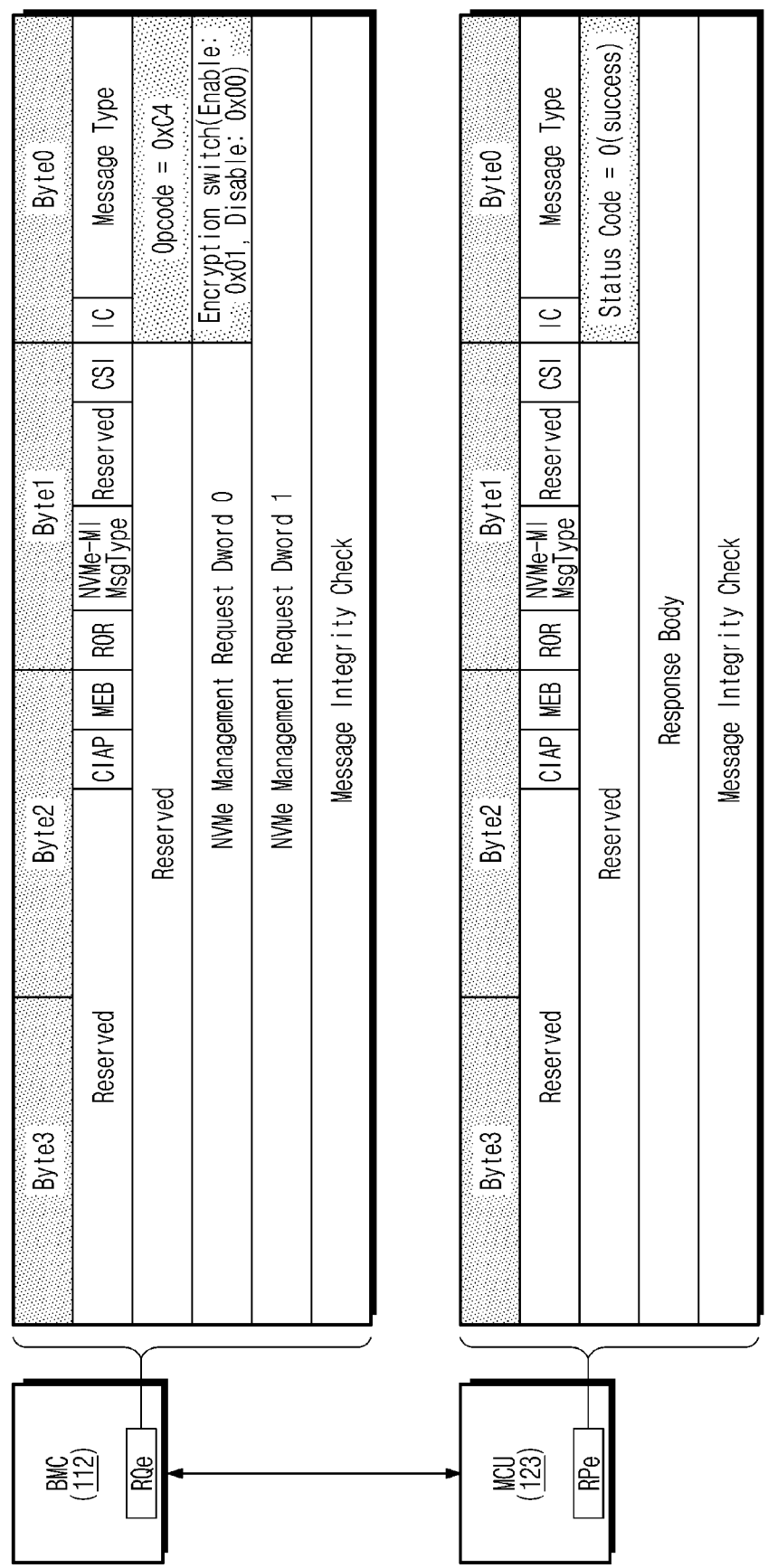

Referring to FIG. 6E, the BMC 112 may provide the request RQe to the MCU 123 through the out-of-band communication. The MCU 123 may provide the response RPe to the BMC 112 through the out-of-band communication.

A value of the bits of the opcode field of the request RQe may be 0xC4. The request RQe may correspond to the encryption enable command. Some of the at least one NVMe management request deword fields of the request RQe may be used as an encryption switch field. The encryption switch field of the request RQe may indicate the enable of the encryption or the disable of the encryption. For example, when the BMC 112 enables the encryption, a value of the encryption switch field may be 0x01. When the BMC 112 disables the encryption, a value of the encryption switch field may be 0x00. The MCU 123 may successfully enable or disable the encryption based on the request RQe.

A status code of the response RPe may include a success code. The success code of the response RPe may indicate that the MCU 123 successfully processes the request RQe.

In an example embodiment, the response RPe may include a security key value that is used in the encryption operation corresponding to the target security algorithm. For example, the encryption switch field of the request RQe may indicate the enable of the encryption. The response RPe may include a security key value that is used in decryption of the BMC 112.

Figure 7:
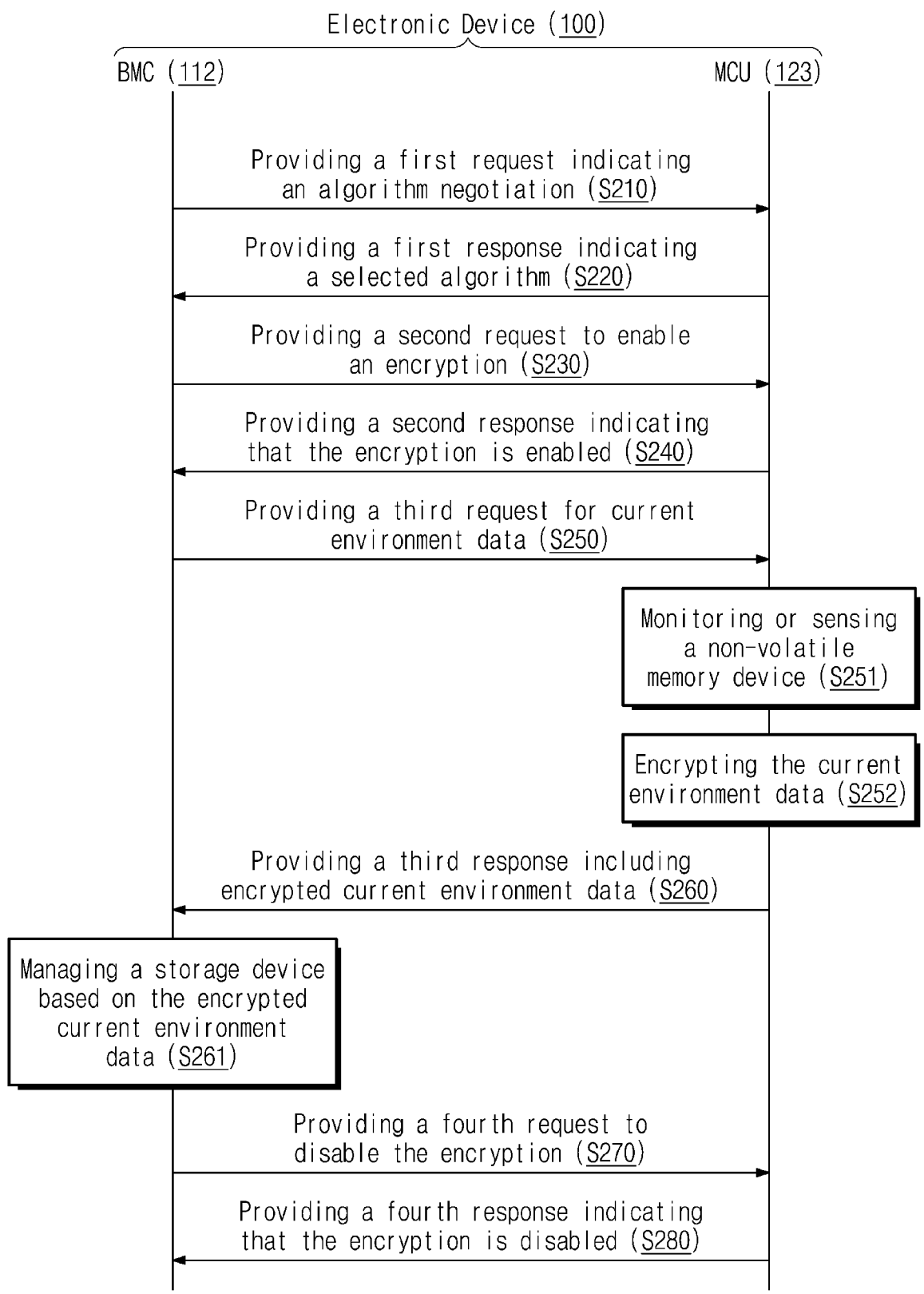
FIG. 7 is a flowchart describing a method of operating an electronic device according to an example embodiment of the disclosure.

FIG. 7 is a flowchart describing a method of operating an electronic device according to an example embodiment of the disclosure.

The electronic device 100 may include the BMC 112 and the MCU 123. The BMC 112 and the MCU 123 may respectively correspond to the BMC 112 and the MCU 123 of FIG. 1. In detail, the electronic device 100 may include a host device and a storage device. The host device may include a processor and the BMC 112. The storage device may include a storage controller and the MCU 123. The processor and the storage controller may support the in-band communication. The BMC 112 and the MCU 123 may support the out-of-band communication.

In operation S210, the BMC 112 of the electronic device 100 may provide a first request indicating an algorithm negotiation to the MCU 123. For example, the bits of the opcode field of the first request may indicate the algorithm negotiation command. The first request may include one or more security algorithms that are supported by the BMC 112. The MCU 123 may select one of the one or more security algorithms of the first request as the target security algorithm. The target security algorithm may be supported by both the BMC 112 and the MCU 123.

In operation S220, the MCU 123 of the electronic device 100 may provide a first response indicating the selected algorithm to the BMC 112. The first response may include the target security algorithm selected by the MCU 123 from among the one or more security algorithms supported by the BMC 112.

In operation S230, the BMC 112 of the electronic device 100 may provide a second request for enabling the encryption to the MCU 123. For example, the bits of the opcode field of the second request may indicate the encryption enable command. The encryption switch field of the second request may indicate the enable of the encryption. The MCU 123 may enable the encryption of the environment data based on the second request. After the encryption is enabled, until the encryption is disabled, the MCU 123 may encrypt the environment data and may provide the encrypted environment data to the BMC 112.

In operation S240, the MCU 123 of the electronic device 100 may provide the BMC 112 with a second response indicating that the encryption is enabled. The status code of the second response may indicate the success of the second request.

In operation S250, the BMC 112 of the electronic device 100 may provide a third request for current environment data to the MCU 123. Bits of the opcode field of the third request may indicate the sensor data command or the telemetry data command. The current environment data may indicate the sensor data or the telemetry data.

In operation S251, the MCU 123 of the electronic device 100 may perform the monitoring operation or the sensing operation of the non-volatile memory device in the storage device and may generate current environment data based on the monitoring operation or the sensing operation.

For example, when the bits of the opcode field of the third request indicate the sensor data command, the MCU 123 may perform the sensing operation of the non-volatile memory device and may generate the sensor data based on the sensing operation. The MCU 123 may manage the sensor data as the current environment data.

According to an example embodiment, the MCU 123 may perform the monitoring operation or the sensing operation of the non-volatile memory device based on the third request from the BMC 112. For example, the MCU 123 may perform the monitoring operation or the sensing operation of the non-volatile memory device in response to the third request from the BMC 112. However, the disclosure is not limited thereto, and as such, according to another example embodiment, the MCU 123 may perform the monitoring operation or the sensing operation of the non-volatile memory device independent of the third request from the BMC 112. For example, the MCU 123 may periodically perform the monitoring operation or the sensing operation of the non-volatile memory device.

As another example, when the bits of the opcode field of the third request indicate the telemetry data command, the MCU 123 may perform the monitoring operation of the non-volatile memory device and may generate the telemetry data based on the monitoring operation. The MCU 123 may manage the telemetry data as the current environment data.

In operation S252, the MCU 123 of the electronic device 100 may encrypt the current environment data. For example, the MCU 123 may encrypt the current environment data based on the target security algorithm selected based on the first request in operation S210.

In operation S260, the MCU 123 of the electronic device 100 may provide a third response including the encrypted current environment data to the BMC 112.

In operation S261, the BMC 112 of the electronic device 100 may manage the storage device based on the encrypted current environment data. For example, the BMC 112 may decrypt the encrypted current environment data. The BMC 112 may check a physical status of the storage device or a reliability level of user data based on the decrypted current environment data and may manage the storage device depending on the checked physical status or reliability level.

In operation S270, the BMC 112 of the electronic device 100 may provide a fourth request for disabling the encryption to the MCU 123. For example, bits of the opcode field of the fourth request may indicate the encryption enable command. The encryption switch field of the fourth request may indicate the disable of the encryption. The MCU 123 may disable the encryption of the environment data based on the fourth request. After the encryption is disabled, until the encryption is again enabled, the MCU 123 may provide the BMC 112 with the environment data not encrypted.

In operation S280, the MCU 123 of the electronic device 100 may provide the BMC 112 with a fourth response indicating that the encryption is disabled. The status code of the fourth response may indicate the success of the fourth request.

Figure 8:
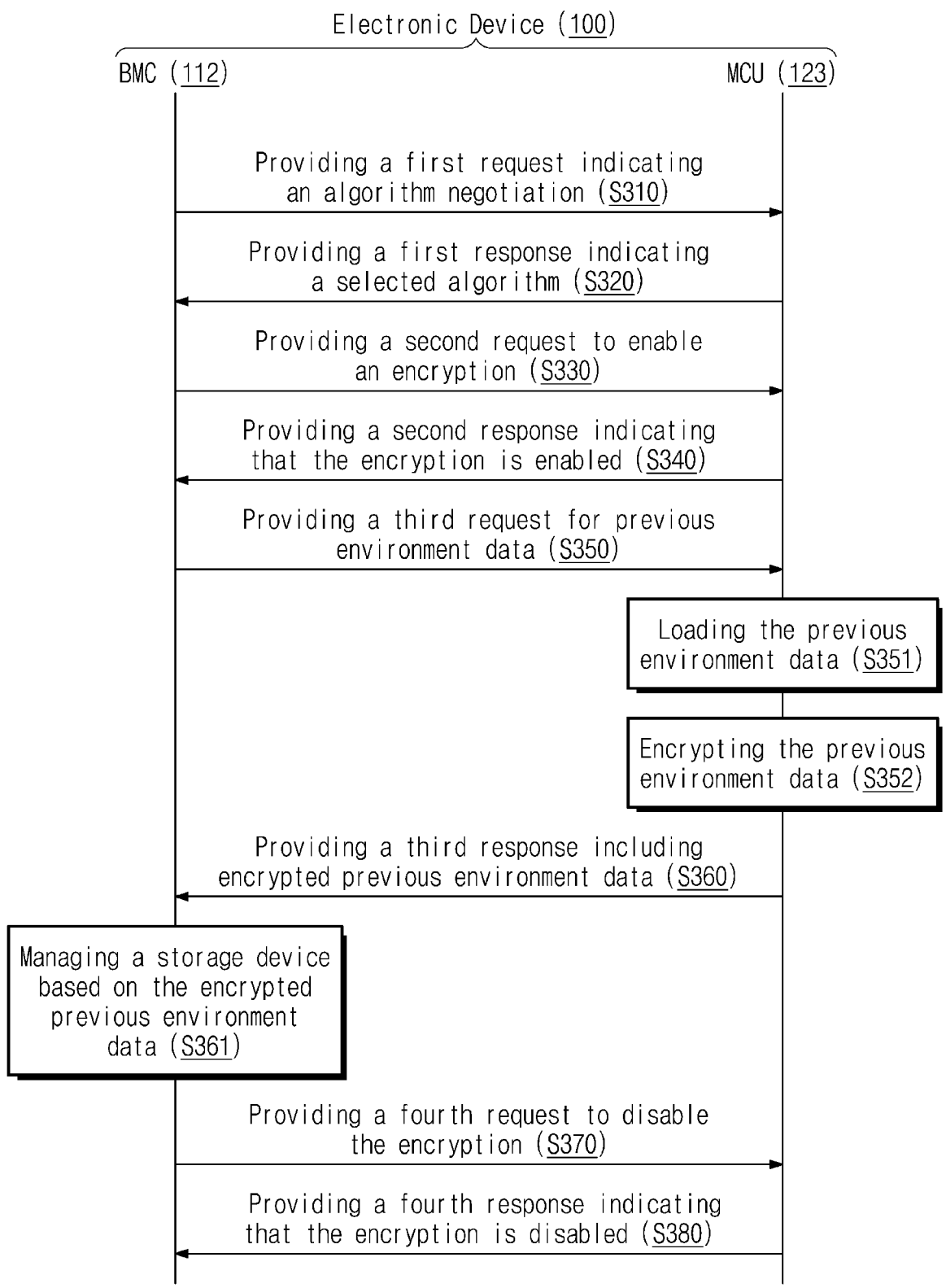
FIG. 8 is a flowchart describing a method of operating an electronic device according to an example embodiment of the disclosure.

FIG. 8 is a flowchart describing a method of operating an electronic device according to an example embodiment of the disclosure. A method of operating an electronic device according to an example embodiment of the disclosure will be described with reference to FIG. 8.

The electronic device 100 may include the BMC 112 and the MCU 123. The BMC 112 and the MCU 123 may respectively correspond to the BMC 112 and the MCU 123 of FIG. 1. In detail, the electronic device 100 may include a host device and a storage device. The host device may include a processor and the BMC 112. The storage device may include a storage controller and the MCU 123. The processor and the storage controller may support the in-band communication. The BMC 112 and the MCU 123 may support the out-of-band communication.

Operation S310, operation S320, operation S330, operation S340, operation S370, and operation S380 are similar to operation S210, operation S220, operation S230, operation S240, operation S270, and operation S280 of FIG. 7, and thus, additional description will be omitted to avoid redundancy.

In operation S350, the BMC 112 of the electronic device 100 may provide a third request for previous environment data to the MCU 123. Bits of the opcode field of the third request may indicate the log data command. The previous environment data may indicate the log data. The log data may be stored in the persistent memory of the MCU 123. The log data may include at least one of previous sensor data generated based on the previous sensing operation and previous telemetry data generated based on the previous monitoring operation.

In operation S351, the MCU 123 of the electronic device 100 may load the previous environment data. For example, the MCU 123 may read the log data stored in the persistent memory embedded in the MCU 123. The MCU 123 may manage the log data as the previous environment data.

In operation S352, the MCU 123 of the electronic device 100 may encrypt the previous environment data. For example, the MCU 123 may encrypt the previous environment data based on the target security algorithm selected based on the first request in operation S310.

In operation S360, the MCU 123 of the electronic device 100 may provide a third response including the encrypted previous environment data to the BMC 112.

In operation S361, the BMC 112 of the electronic device 100 may manage the storage device based on the encrypted previous environment data. For example, the BMC 112 may decrypt the encrypted previous environment data. The BMC 112 may check a physical status of the storage device or a reliability level of user data based on the decrypted previous environment data and may manage the storage device depending on the checked physical status or reliability level.

Figure 9:
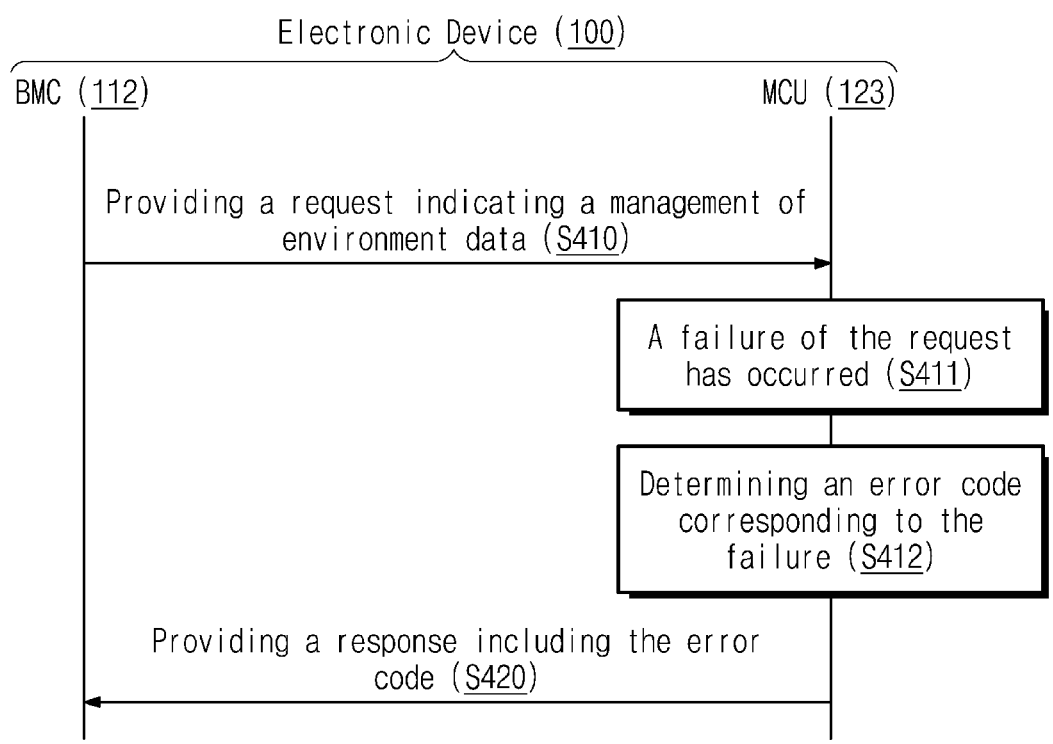
FIG. 9 is a flowchart describing a method of operating an electronic device according to an example embodiment of the disclosure.

FIG. 9 is a flowchart describing a method of operating an electronic device according to an example embodiment of the disclosure. A method of operating an electronic device according to an example embodiment of the disclosure will be described with reference to FIG. 9.

The electronic device 100 may include the BMC 112 and the MCU 123. The BMC 112 and the MCU 123 may respectively correspond to the BMC 112 and the MCU 123 of FIG. 1. In detail, the electronic device 100 may include a host device and a storage device. The host device may include a processor and the BMC 112. The storage device may include a storage controller and the MCU 123. The processor and the storage controller may support the in-band communication. The BMC 112 and the MCU 123 may support the out-of-band communication.

In operation S410, the BMC 112 of the electronic device 100 may provide the MCU 123 with a request indicating the management of the environment data. For example, bits of the opcode field of the request may indicate the sensor data command, the log data command, the telemetry data command, the algorithm negotiation command, or the encryption enable command.

In operation S411, the MCU 123 of the electronic device 100 may fail to process the request in operation S410. The failure of the request in operation S410 may occur. For example, the MCU 123 may fail to process the request in operation S410 due to various factors.

In operation S412, the MCU 123 of the electronic device 100 may determine an error code corresponding to the failure in operation S411. The error code may indicate a factor causing the failure of the request in operation S411. This will be described in detail with reference to FIG. 10.

In operation S420, the MCU 123 of the electronic device 100 may provide the BMC 112 with a response indicating the error code in operation S412.

FIG. 10 is a diagram describing a protocol of out-of-band communication according to an example embodiment of the disclosure. An error code according to the protocol of the out-of-band communication will be described with reference to FIG. 10. The error code may be written in the status code field of the response provided through the out-of-band communication. The error code may be used when the request fails. The error code may indicate a factor causing the failure of the request.

In a first index (index 1), the error type may indicate an invalid command opcode. For example, the error type may indicate that a value of bits of the opcode field of the request received from the BMC is invalid. A value of the error code written in the status code field may be 03h.

In a second index (index 2), the error type may indicate an invalid parameter. For example, the error type may indicate that the IC field is invalid. A value of the error code written in the status code field may be 04h.

In a third index (index 3), the error type may indicate an invalid parameter. For example, the error type may indicate that the ROR field is invalid. When the ROR field has a value other than a flag value corresponding to the request and a flag value corresponding to the response, the ROR field may be invalid. A value of the error code written in the status code field may be 04h.

In a fourth index (index 4), the error type may indicate an invalid parameter. For example, the error type may indicate that the NVMe_MI message type is invalid. A value of the error code written in the status code field may be 04h.

In a fifth index (index 5), the error type may indicate an invalid command size. For example, the error type may indicate that a size of a message body of the request received from the BMC exceeds a reference size. Because the size of the message body is different from an expected size, the MCU may have difficulty in processing the request. A value of the error code written in the status code field may be 05h.

In a sixth index (index 6), the error type may indicate a vendor specific error. For example, the error type may indicate that the request received from the BMC is invalid as a result of the message integrity check for the request. When a result of the cyclic redundancy check (CRC) indicates that the request has integrity, the error type of the sixth index may be used. A value of the error code written in the status code field may be E1h.

In a seventh index (index 7), the error type may indicate a vendor specific error. For example, the error type may indicate that all the security algorithms supported by the BMC are not supported by the MCU. When the MCU is incapable of selecting the target security algorithm, the error type of the seventh index may be used. A value of the error code written in the status code field may be E2h.

In an eighth index (index 8), the error type may indicate a vendor specific error. For example, the error type may indicate the failure of the encryption by the MCU. After the encryption is enabled depending on the request of the BMC, when the MCU fails to encrypt the environment data or when the BMC fails to decrypt the encrypted environment data, the erase type of the eighth index may be used. A value of the error code written in the status code field may be E3h.

However, the disclosure is not limited thereto. For example, error codes indicating any other factors may be further included in addition to the error types described with reference to FIG. 10.

Figure 11:
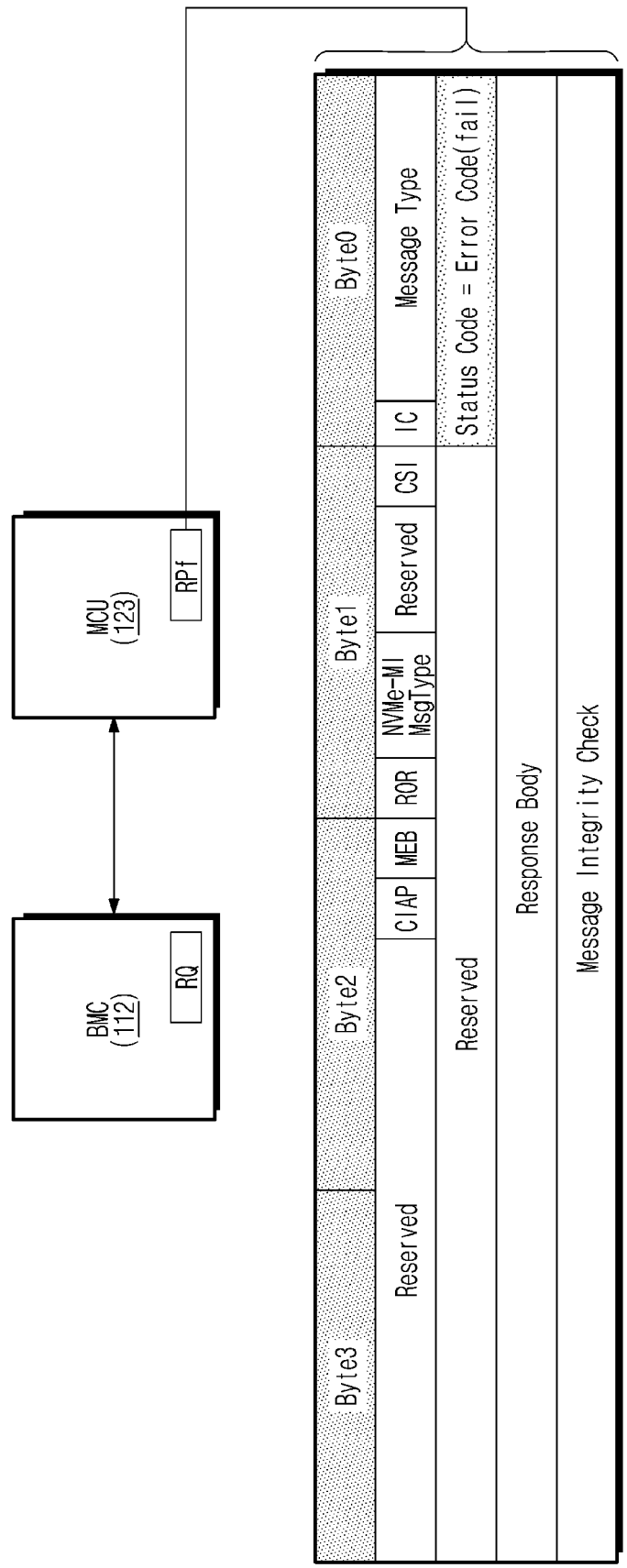
FIG. 11 is a diagram describing fields of a protocol of out-of-band communication according to an example embodiment of the disclosure.

FIG. 11 is a diagram describing fields of a protocol of out-of-band communication according to an example embodiment of the disclosure. Referring to FIG. 11, the BMC 112 may provide the request RQ to the MCU 123 through the out-of-band communication. The request RQ may correspond to the request RQa of FIG. 6A, the request RQb of FIG. 6B, the request RQc of FIG. 6C, the request RQd of FIG. 6D, or the request RQe of FIG. 6E. The MCU 123 may fail to process the request RQ received from the BMC 112. That is, the failure of the request RQ may occur.

The MCU 123 may provide a response RPf to the BMC 112 through the out-of-band communication. The response RPf may indicate the failure of the request RQ.

The response RPf may include at least one of the message type field, the IC field, the reserved field, the NVMe_MI message type field, the ROR field, the MEB field, the CIAP field, the status code field, the response body field, and the message integrity field. Features of the above fields are similar to those described with reference to FIGS. 6A to 6E, and thus, additional description will be omitted to avoid redundancy.

When the MCU 123 fails to process the request RQ, the MCU 123 may provide the BMC 112 with the response RPf including the status code field in which the error code is written. The error code may be one of the error codes described with reference to FIG. 10.

Figure 12:
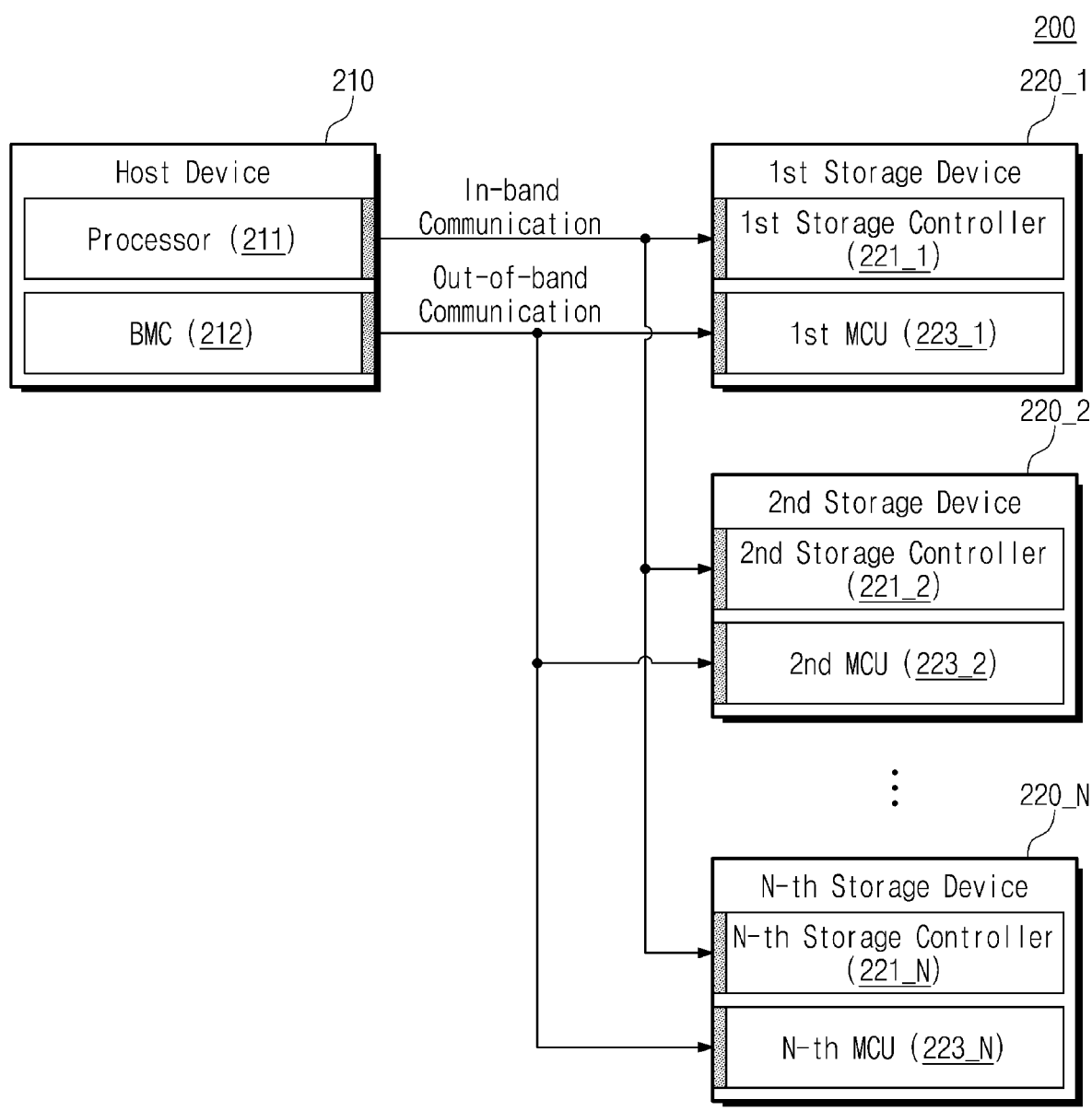
FIG. 12 is a block diagram of an electronic device according to an example embodiment of the disclosure.

FIG. 12 is a block diagram of an electronic device according to an example embodiment of the disclosure. Referring to FIG. 12, an electronic device 200 may include a host device 210 and first to N-th storage devices 220_1 to 220_N. Each of the first to N-th storage devices 220_1 to 220_N may operate to be similar to the storage device 120 of FIG. 1.

The host device 210 may include a processor 211 and a BMC 212. The processor 211 and the BMC 212 may respectively correspond to the processor 111 and the BMC 112 of FIG. 1.

The first storage device 220_1 may include a first storage controller 221_1 and a first MCU 223_1. The first storage controller 221_1 may support the in-band communication with the processor 211. The first MCU 223_1 may support the out-of-band communication with the BMC 212.

The second storage device 220_2 may include a second storage controller 221_2 and a second MCU 223_2. The second storage controller 221_2 may support the in-band communication with the processor 211. The second MCU 223_2 may support the out-of-band communication with the BMC 212.

The N-th storage device 220_N may include an N-th storage controller 221_N and an N-th MCU 223_N. The N-th storage controller 221_N may support the in-band communication with the processor 211. The N-th MCU 223_N may support the out-of-band communication with the BMC 212. Herein, "N" may be irrelevant to the number of algorithms of FIG. 6D and may be an arbitrary natural number.

The processor 211 of the host device 210 may support the in-band communication for each of the first to N-th storage controllers 221_1 to 221_N.

The BMC 212 of the host device 210 may support the out-of-band communication for each of the first to N-th MCU 223_1 to 223_N.

The host device 210 may independently manage the first to N-th storage devices 220_1 to 220_N through the out-of-band communication.

For example, the method of operating the electronic device 200 may include providing, by the BMC 212, a first request indicating the management of first environment data to the first MCU 223_1 through the out-of-band communication, providing, by the first MCU 223_1, a first response corresponding to the first request to the BMC 212 through the out-of-band communication, providing, by the BMC 212, a second request to the second MCU 223_2 indicating the management of second environment data through the out-of-band communication, and providing, by the second MCU 223_2, a second response corresponding to the second request to the BMC 212 through the out-of-band communication.

According to an example embodiment of the disclosure, an electronic device supporting out-of-band communication and a method of operating the same are provided.

Also, an electronic device that supports the bidirectional communication between the BMC and the MCU, transfers a variety of information of a storage device through the out-of-band communication, and drives the MCU by using an individual power supply voltage and a method of operating the same are provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A method of operating an electronic device including a host device having processor and a baseboard management controller (BMC), and a storage device having a storage controller and a micro controller unit (MCU), the method comprising:

providing, by the BMC of the host device, a first request comprising a first opcode field indicating a request for environment data to the MCU of the storage device through an out-of-band communication; and providing, by the MCU, a first response including the environment data corresponding to the first request to the BMC through the out-of-band communication, wherein the processor of the host device and the storage controller of the storage device communicate with each other through an in-band communication different from the out-of-band communication, and wherein the BMC and the MCU directly communicate with each other through the out-of-band communication.

2. The method of claim 1, further comprises:

storing user data in a non-volatile memory device of the storage device;

generating sensor data, by a sensor device of the storage device, based on a sensing operation of the non-volatile memory device;

generating telemetry data based on a status monitoring operation of the non-volatile memory device;

receiving, by the MCU, the sensor data from the sensor device;

receiving, by the MCU, the telemetry data from the storage controller; and storing, by the MCU, at least one of previous sensor data and previous telemetry data as log data, wherein the environment data comprises one of the sensor data, the log data, or the telemetry data.

3. The method of claim 2, wherein the sensor data comprise at least one of voltage sensor data, current sensor data, temperature sensor data, or humidity sensor data.

4. The method of claim 2, wherein the telemetry data comprise at least one of program/erase (P/E) cycle information, program count information, erase count information, read count information, error bit count information, or threshold voltage distribution information.

5. The method of claim 1, wherein first bits of the first opcode field of the first request indicate a sensor data command, and wherein a response body field of the first response comprises current sensor data.

6. The method of claim 1, wherein first bits of the first opcode field of the first request indicate a log data command, wherein a response body field of the first response comprises log data, and wherein the log data comprise at least one of previous sensor data or previous telemetry data.

7. The method of claim 1, wherein first bits of the first opcode field of the first request indicate a telemetry data command, and wherein a response body field of the first response comprises current telemetry data.

8. The method of claim 1, wherein first bits of the first opcode field of the first request indicate an algorithm negotiation command, wherein the first request comprises at least one security algorithms supported by the BMC, and wherein a response body field of the first response comprises a target security algorithm selected by the MCU from among the at least one security algorithms.

9. The method of claim 1, wherein first bits of the first opcode field of the first request indicate an encryption enable command, wherein an encryption switch field of the first request comprises an encryption enable or an encryption disable, and wherein a status code of the first response comprises a success of the first request.

10. The method of claim 1, wherein the storage device further includes a non-volatile memory device configured to store user data, wherein first bits of the first opcode field of the first request indicate an algorithm negotiation command, wherein the first request comprises at least one security algorithms supported by the BMC, wherein a response body field of the first response comprises a target security algorithm selected by the MCU from among the at least one security algorithms, and wherein the method further comprises:

providing, by the BMC, a second request comprising a second opcode field having second bits indicating an encryption enable command to the MCU through the out-of-band communication, based on the first response;

providing, by the MCU, a second response comprising a status code indicating a success of the second request to the BMC through the out-of-band communication;

providing, by the BMC, a third request comprising a third opcode field having third bits indicating a sensor data command or a telemetry data command to the MCU through the out-of-band communication;

generating, by the MCU, current environment data by performing a status monitoring operation or a sensing operation of the non-volatile memory device based on the third request;

encrypting, by the MCU, the current environment data based on the target security algorithm;

providing, by the MCU, the encrypted current environment data to the BMC through the out-of-band communication; and managing, by the BMC, the storage device based on the encrypted current environment data.

11. The method of claim 1, wherein the storage device further includes a non-volatile memory device configured to store user data, wherein the MCU includes a persistent memory configured to store previous environment data generated by performing a previous status monitoring operation or a previous sensing operation of the non-volatile memory device, wherein first bits of the first opcode field of the first request indicate an algorithm negotiation command, wherein the first request includes at least one security algorithms supported by the BMC, wherein a response body field of the first response includes a target security algorithm selected by the MCU from among the at least one security algorithms, and wherein the method further comprises:

providing, by the BMC, a second request including a second opcode field having second bits indicating an encryption enable command to the MCU through the out-of-band communication, based on the first response;

providing, by the MCU, a second response including a status code indicating a success of the second request to the BMC through the out-of-band communication;
providing, by the BMC, a third request including a third opcode field having third bits indicating a log data command to the MCU through the out-of-band communication;
loading, by the MCU, the previous environment data of the persistent memory based on the third request;
encrypting, by the MCU, the previous environment data based on the target security algorithm;
providing, by the MCU, the encrypted previous environment data to the BMC through the out-of-band communication; and
managing, by the BMC, the storage device based on the encrypted previous environment data.

12. The method of claim 1, wherein a status code of the first response comprises an error type indicating a failure of the first request, and
wherein the error type comprises at least one of:
a first error type indicating that a value corresponding to first bits of the first opcode field of the first request is invalid;
a second error type indicating that an integrity check (IC) field of the first request is invalid;
a third error type indicating that a request or response (ROR) field of the first request is invalid;
a fourth error type indicating that a Non-Volatile Memory Express Management Interface (NVMe_MI) message type of the first request is invalid;
a fifth error type indicating that a size of a message body of the first request exceeds a reference size;
a sixth error type indicating that the first request is invalid as a result of a message integrity check for the first request;
a seventh error type indicating that all of at least one security algorithms supported by the BMC are not supported by the MCU; or
an eighth error type indicating a failure of encryption by the MCU.

13. The method of claim 1, further comprising: supplying, by a main power supplier of the host device, a first power supply voltage to the storage controller; and
supplying, by an auxiliary power supplier of the host device, a second power supply voltage different from the first power supply voltage to the MCU.

14. The method of claim 1, wherein the electronic device further includes an additional storage device, and
wherein the additional storage device further includes an additional storage controller and an additional MCU,
wherein the method further comprises:
performing a first communication operation directly between the processor and the additional storage controller through the in-band communication, and
performing a second communication operation directly between the BMC and the additional MCU through the out-of-band communication.

15. A method of operating an electronic device including a host device including a processor and a baseboard management controller (BMC), a first storage device including a first storage controller and a first micro controller unit (MCU), and a second storage device including a second storage controller and a second MCU, the method comprising:

providing, by the BMC, a first request comprising information corresponding to first environment data to the first MCU through an out-of-band communication;
providing, by the first MCU, a first response corresponding to the first request to the BMC through the out-of-band communication;
providing, by the BMC, a second request comprising information corresponding to second environment data to the second MCU through the out-of-band communication; and
providing, by the second MCU, a second response corresponding to the second request to the BMC through the out-of-band communication,
wherein the processor communicates with the first and the second storage controllers through an in-band communication different from the out-of-band communication.

16. The method of claim 15, wherein first bits of a first opcode field of the first request indicate a sensor data command, a log data command, a telemetry data command, an algorithm negotiation command, or an encryption enable command.

17. An electronic device comprising:
a host device comprising a processor and a baseboard management controller (BMC); and
a storage device comprising a storage controller and a micro controller unit (MCU),
wherein the BMC is configured to provide a request comprising information corresponding to environment data to the MCU through an out-of-band communication,
wherein the MCU is configured to provide a response corresponding to the request to the BMC through the out-of-band communication, and
wherein the processor and the storage controller communicate with each other through an in-band communication different from the out-of-band communication.

18. The electronic device of claim 17, wherein the storage device further comprises:
a non-volatile memory device configured to store user data; and
a sensor device configured to generate sensor data based on a sensing operation of the non-volatile memory device,
wherein the storage controller is configured to generate telemetry data based on a status monitoring operation of the non-volatile memory device, and
wherein the MCU is further configured to:
receive the sensor data from the sensor device;
receive the telemetry data from the storage controller; and
store at least one of previous sensor data and previous telemetry data as log data.

19. The electronic device of claim 17, wherein the host device further comprises:
a main power supplier configured to supply a first power supply voltage to the storage controller; and
an auxiliary power supplier configured to supply a second power supply voltage different from the first power supply voltage to the MCU.

20. The electronic device of claim 17, wherein the request comprises a first opcode field indicating a sensor data command, a log data command, a telemetry data command, an algorithm negotiation command, or an encryption enable command.

* * * * *